(12) United States Patent
Honkanen et al.

(10) Patent No.: US 8,965,284 B2
(45) Date of Patent: Feb. 24, 2015

(54) FACILITATING POSITIONING THROUGH BLUETOOTH LOW ENERGY WIRELESS MESSAGING

(75) Inventors: Mauri Juhana Honkanen, Tampere (FI); Antti Paavo Tapani Kainulainen, Espoo (FI); Juha Johannes Salokannel, Tampere (FI); Jukka Pekka Reunamäki, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/081,657

(22) Filed: Apr. 7, 2011

(65) Prior Publication Data
US 2012/0258669 A1 Oct. 11, 2012

(51) Int. Cl.
| H04B 7/00 | (2006.01) |
| G01S 3/46 | (2006.01) |
| H04W 4/00 | (2009.01) |
| H04W 64/00 | (2009.01) |
| G01S 5/12 | (2006.01) |
| H04W 80/02 | (2009.01) |
| H04L 29/06 | (2006.01) |

(52) U.S. Cl.
CPC ............... *G01S 3/46* (2013.01); *H04W 4/008* (2013.01); *H04W 64/00* (2013.01); *G01S 5/12* (2013.01); *H04W 80/02* (2013.01); *H04L 69/24* (2013.01)
USPC ........................................ 455/41.2; 455/41.1

(58) Field of Classification Search
USPC ........................................................ 455/41.1
See application file for complete search history.

(56) References Cited

U.S. PATENT DOCUMENTS

| 6,380,888 B1 | 4/2002 | Kucik |
| 6,975,618 B1 | 12/2005 | Smith et al. |
| 6,987,975 B1 | 1/2006 | Irvin et al. |
| 7,181,230 B2 | 2/2007 | Nonoyama et al. |

(Continued)

FOREIGN PATENT DOCUMENTS

| CN | 201131037 Y | 10/2008 |
| EP | 1416703 | 5/2004 |

(Continued)

OTHER PUBLICATIONS

Bluetooth Specification Version 4.0, vols. 0-6, Jun. 30, 2010, pp. 1-2302.

(Continued)

*Primary Examiner* — David Bilodeau
(74) *Attorney, Agent, or Firm* — Locke Lord LLP

(57) ABSTRACT

A system for providing positioning-related information within wireless communication signals. For example, an apparatus (e.g., acting as a tracker) may receive one or more messages advertising the presence of another apparatus (e.g., acting as a target). The advertisement messages may further comprise information indicating the availability of positioning-related information from the target apparatus. The tracker device may then determine, based on the received information, that positioning-related interaction with the target apparatus is available. If determined to be available, the tracker and target may interact with each other in order to initiate positioning-related information transmission. After receiving at least one message comprising positioning-related information from the target apparatus, the tracker apparatus may then determine at least one of a relative direction towards or from the target apparatus based on the received positioning-related information.

23 Claims, 18 Drawing Sheets

(56) References Cited

U.S. PATENT DOCUMENTS

| | | | |
|---|---|---|---|
| 7,512,685 B2 | 3/2009 | Lunsford et al. | |
| 7,606,578 B2 | 10/2009 | Irvin et al. | |
| 7,986,917 B2 | 7/2011 | Ahlgren et al. | |
| 8,165,523 B2 | 4/2012 | Makela et al. | |
| 8,249,035 B2 | 8/2012 | Godavarti et al. | |
| 2002/0175819 A1 | 11/2002 | Joo | |
| 2003/0220114 A1 | 11/2003 | Langensteiner et al. | |
| 2004/0142690 A1 | 7/2004 | Eom et al. | |
| 2004/0162059 A1 | 8/2004 | Hiltunen et al. | |
| 2005/0032531 A1* | 2/2005 | Gong et al. | 455/456.5 |
| 2005/0156712 A1 | 7/2005 | Jyrinki | |
| 2005/0267677 A1* | 12/2005 | Poykko et al. | 701/207 |
| 2005/0289236 A1 | 12/2005 | Hull et al. | |
| 2006/0019679 A1* | 1/2006 | Rappaport et al. | 455/456.5 |
| 2007/0042710 A1 | 2/2007 | Mahini et al. | |
| 2007/0099679 A1 | 5/2007 | Saarisalo | |
| 2007/0123273 A1 | 5/2007 | Vare et al. | |
| 2007/0167171 A1* | 7/2007 | Bishop | 455/456.1 |
| 2007/0197229 A1 | 8/2007 | Kalliola et al. | |
| 2008/0154501 A1 | 6/2008 | Meyer | |
| 2008/0311957 A1* | 12/2008 | Jantunen et al. | 455/560 |
| 2009/0221298 A1* | 9/2009 | Hanner | 455/456.1 |
| 2010/0081376 A1 | 4/2010 | Emura | |
| 2010/0250135 A1 | 9/2010 | Li et al. | |
| 2010/0291952 A1 | 11/2010 | Gosset et al. | |
| 2010/0309051 A1* | 12/2010 | Moshfeghi | 342/378 |
| 2010/0317289 A1 | 12/2010 | Desai et al. | |
| 2011/0110338 A1 | 5/2011 | Khoryaev et al. | |
| 2011/0201357 A1* | 8/2011 | Garrett et al. | 455/456.2 |
| 2012/0052802 A1* | 3/2012 | Kasslin et al. | 455/41.2 |
| 2012/0178471 A1* | 7/2012 | Kainulainen et al. | 455/456.1 |
| 2012/0238288 A1* | 9/2012 | Donaldson | 455/456.1 |

FOREIGN PATENT DOCUMENTS

| | | |
|---|---|---|
| EP | 1538791 | 6/2005 |
| EP | 2474834 | 7/2012 |
| WO | WO9810307 | 3/1998 |
| WO | WO0201814 | 1/2002 |

OTHER PUBLICATIONS

Partial European Search Report mailed May 4, 2012 for European Application No. 11195136A, 5 pages.
GPS Navstar: "Global Positioning System Standard Positioning Service Signal Specification", 2nd Edition, Jun. 2, 1995, 52 pages.
Extended European Search Report and Opinion for European Application No. EP 11195869—Date of Completion of Search: Jan. 30, 2013, 10 pages.
Extended European Search Report for EP App. No. 12160097.7—Date of Completion of Search: Jul. 23, 2013, 9 pages.
English Language Machine Translation of Chinese Patent Application Publication No. CN201131037Y—5 pages.
Bluetooth Specification Version 4.0, vols. 0-6, Jun. 30, 2010, pp. 1-2301.

* cited by examiner

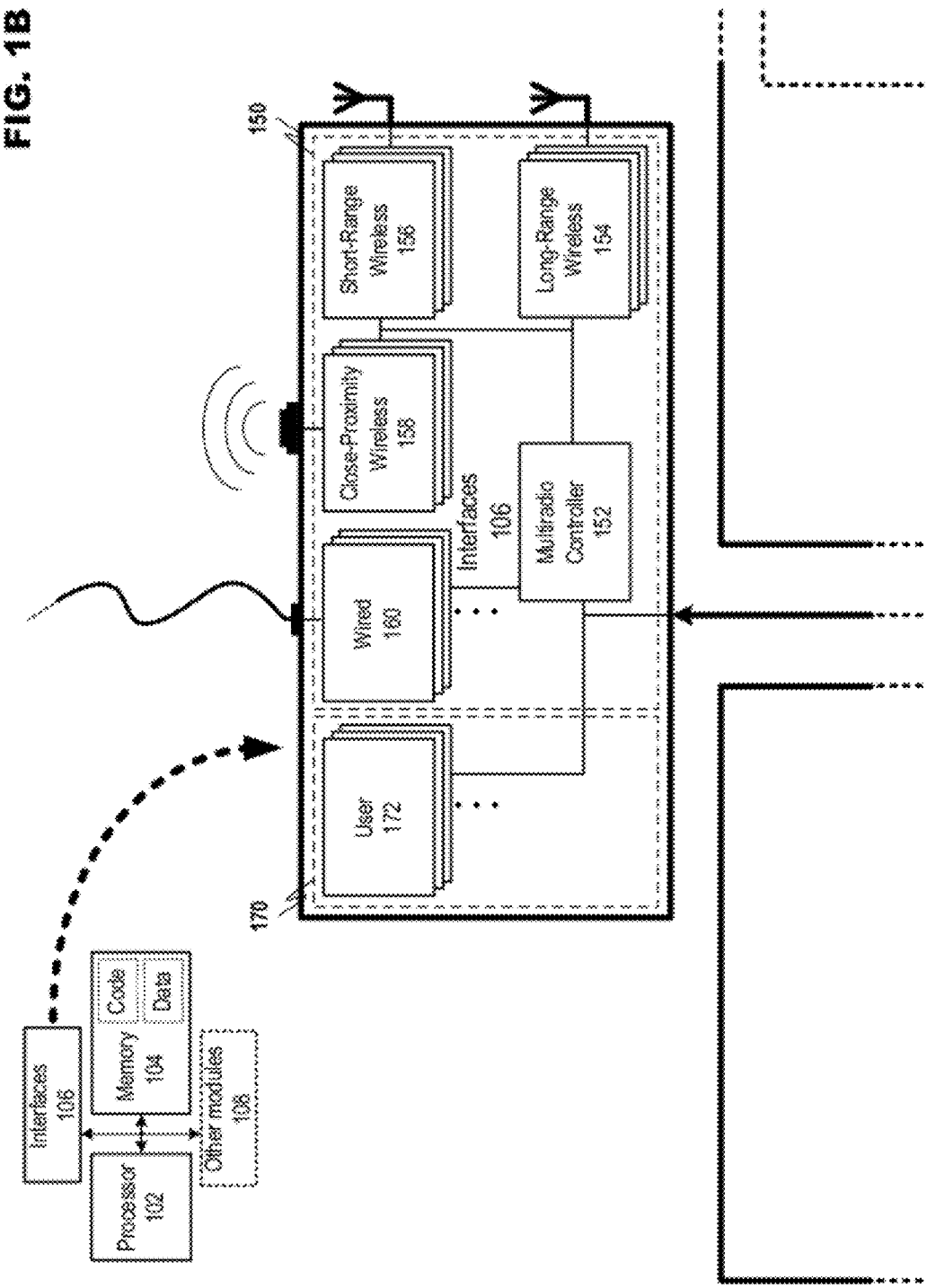

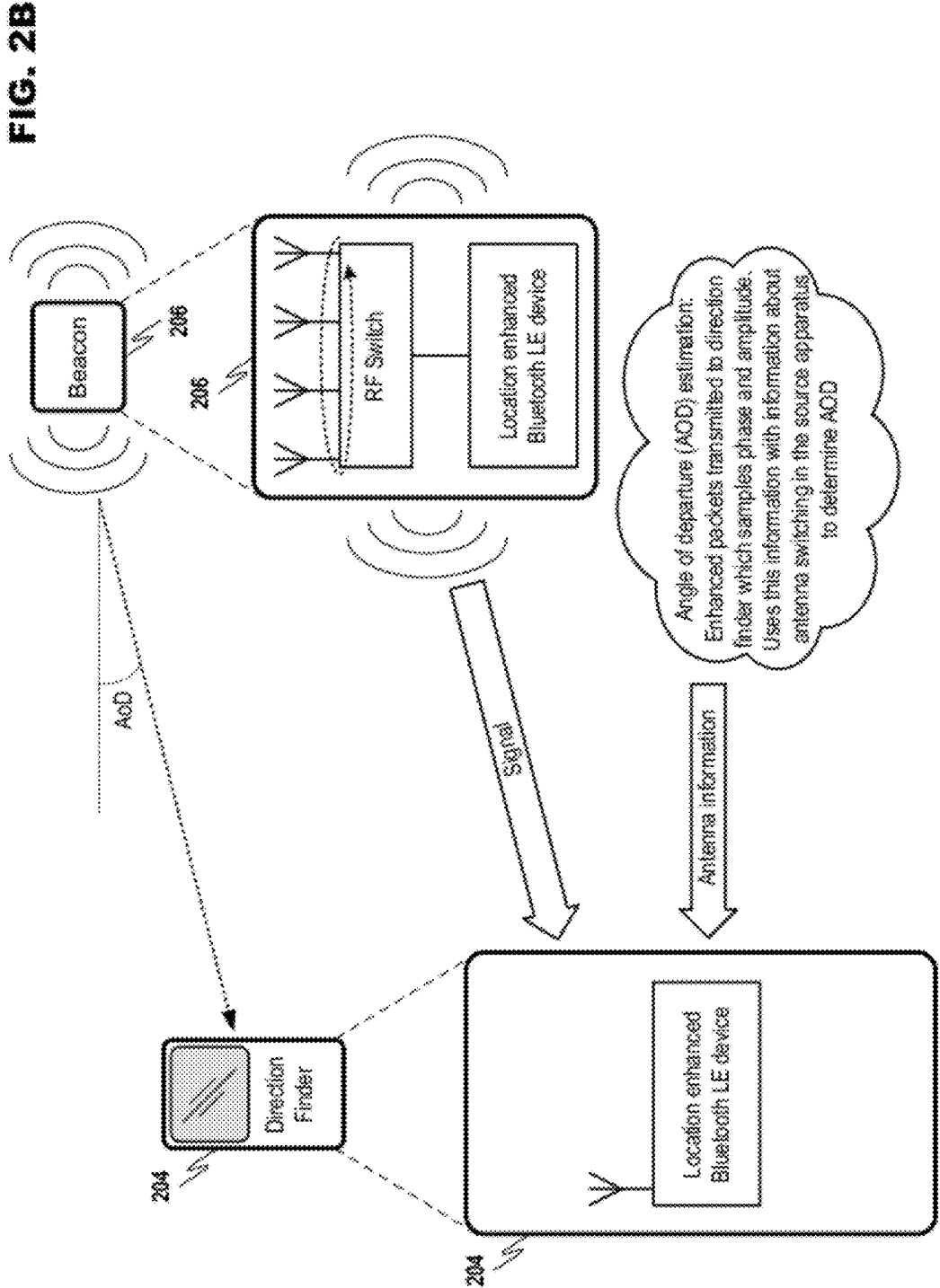

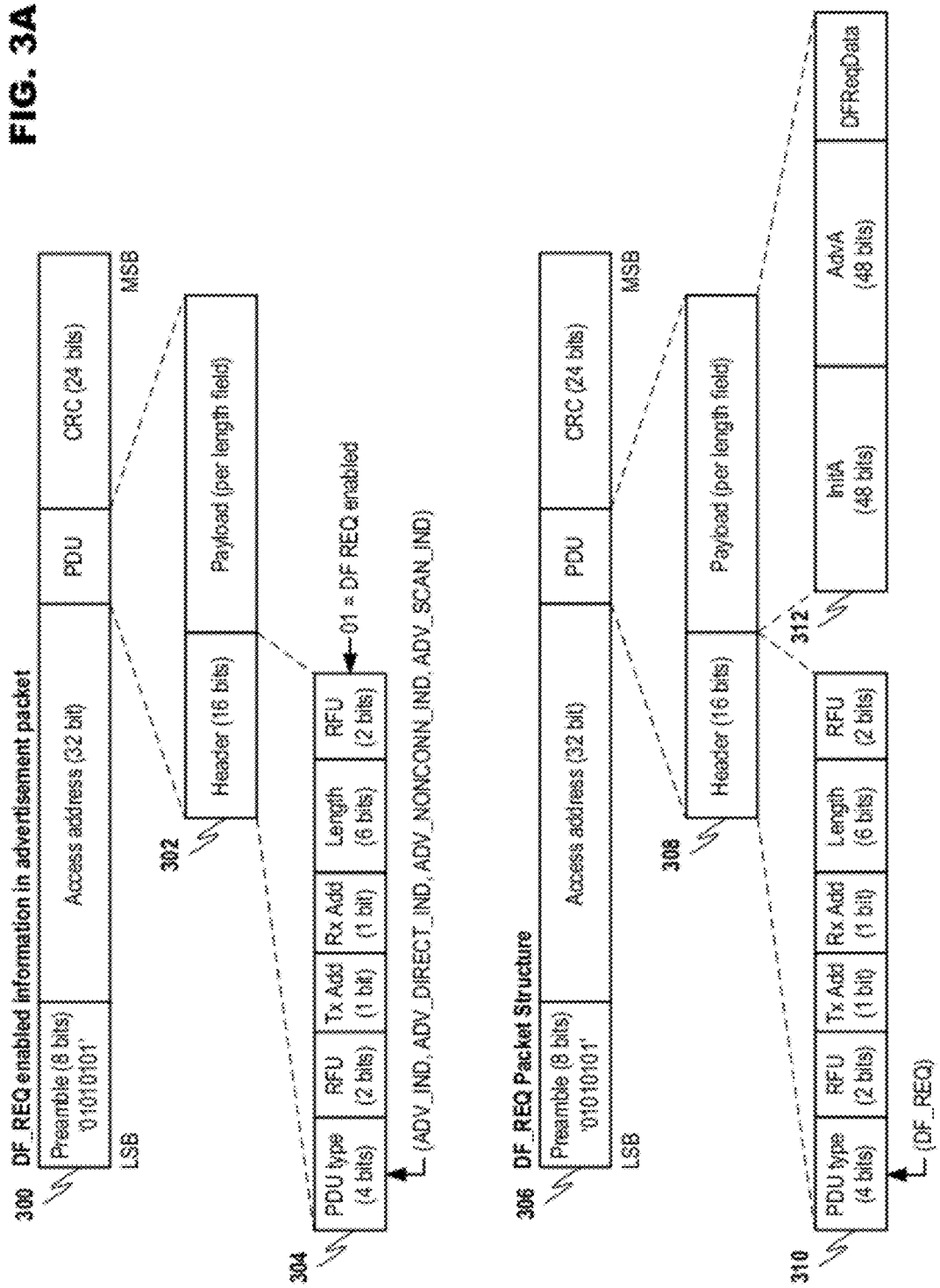

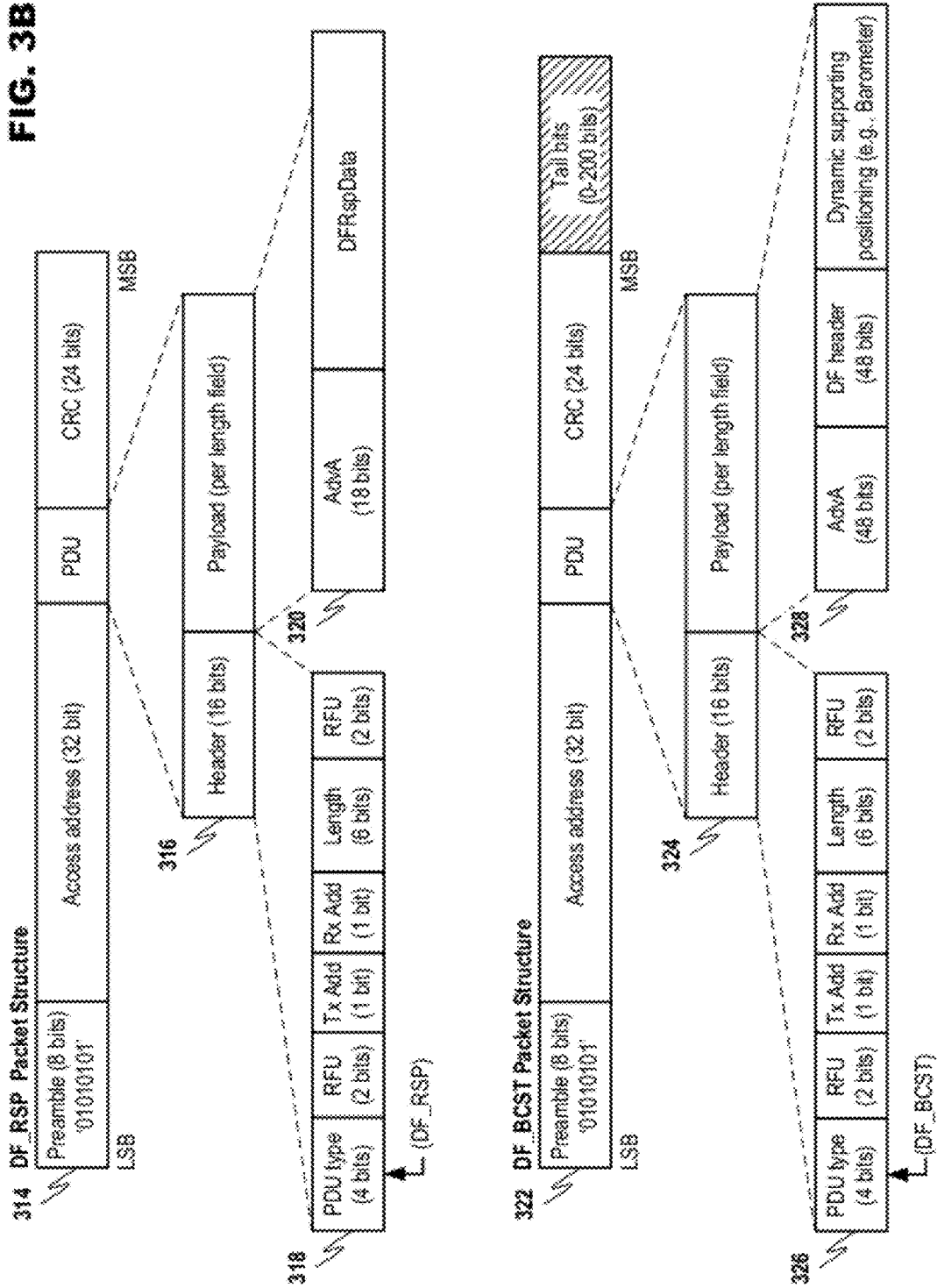

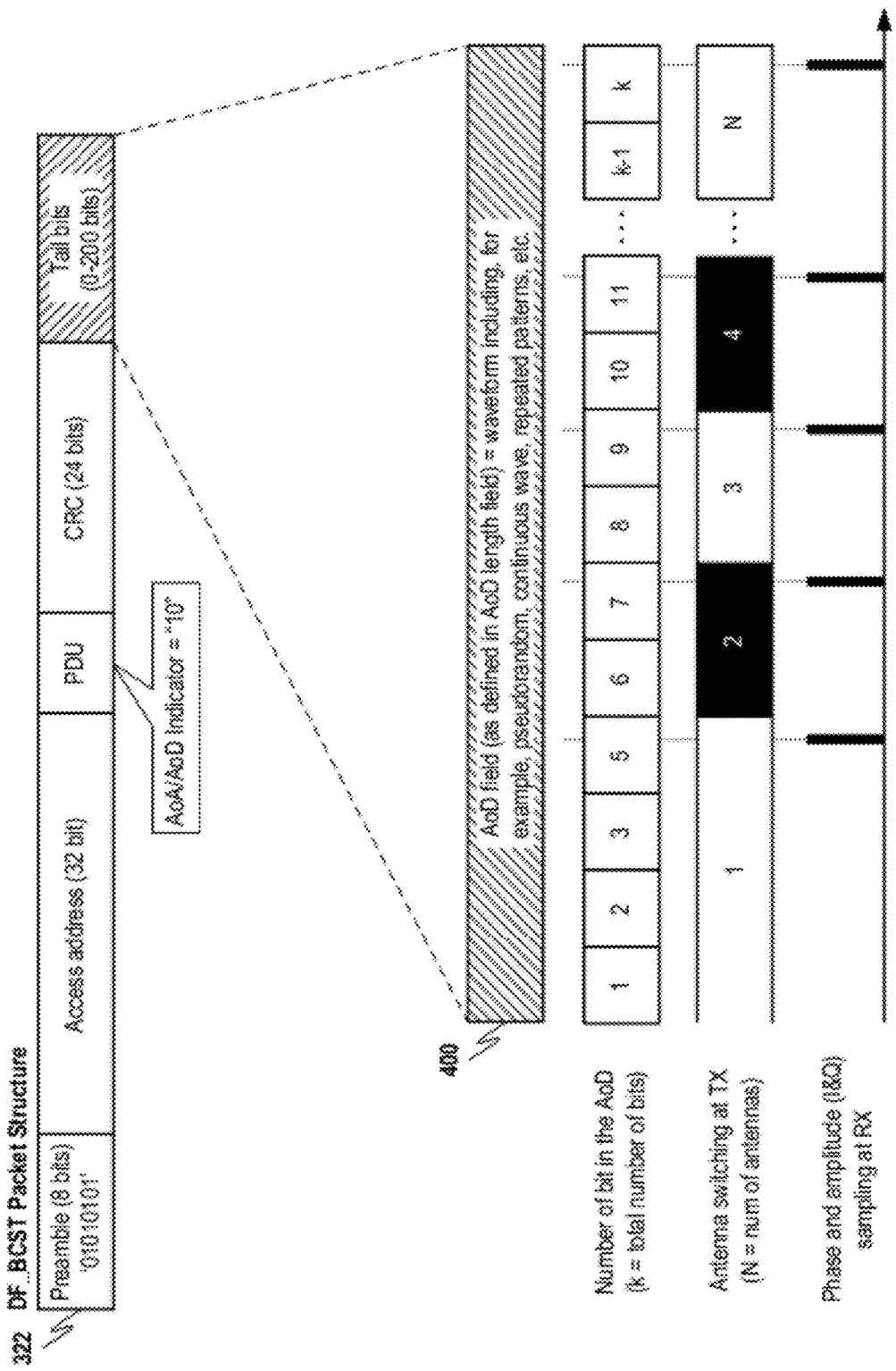

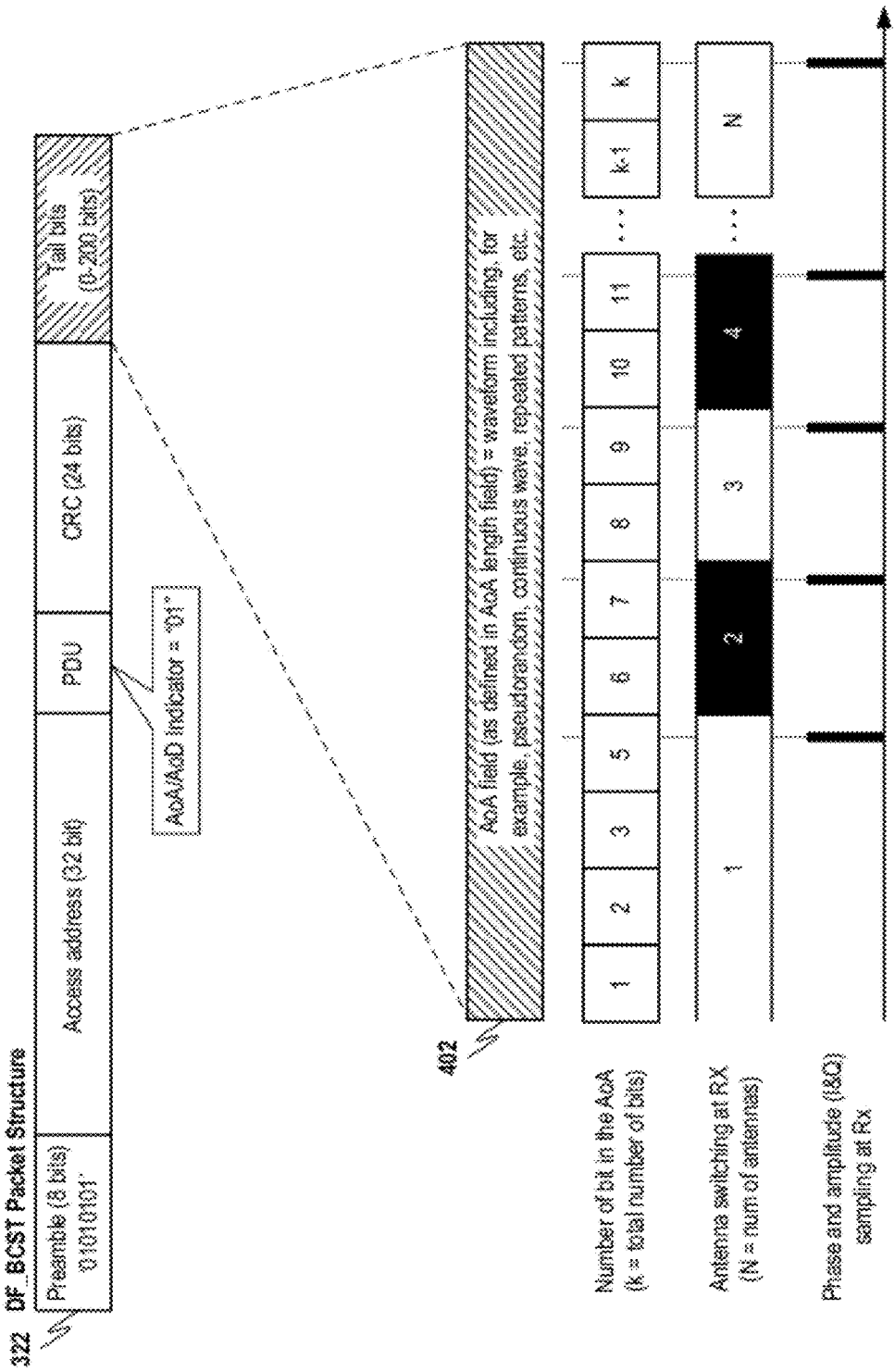

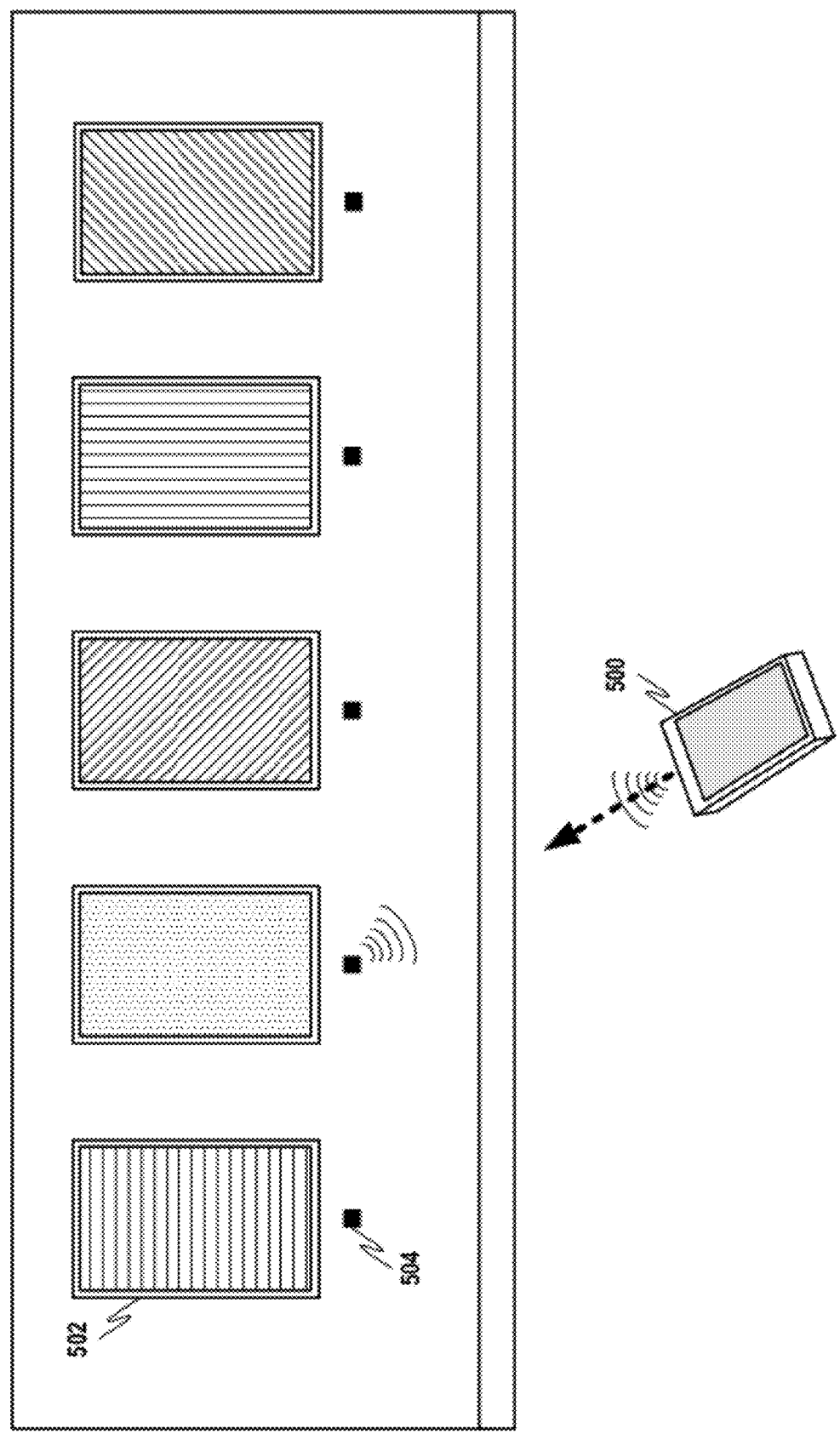

FACILITATING POSITIONING THROUGH BLUETOOTH LOW ENERGY WIRELESS MESSAGING

BACKGROUND

1. Field of Invention

The present invention relates to wireless communication, and in particular, to the provision of information usable for performing positioning operations in communication signals.

2. Background

The desire for apparatuses to serve in a multitude of roles is driving designers to incorporate more and more functionality into emerging devices. Wireless-enabled apparatuses are not only limited to the traditional conveyance of audio information, such as during telephonic operations, but may also convey video and other types of information for supporting a multitude of applications. For example, various applications may provide functionality on the surface that relies upon underlying wireless interaction for support. Obvious examples of such applications include programs that allow users to communicate directly with other users or resources, such as email, messaging services, Internet browsers, etc. There are also categories of applications that may provide services not directly related to user communication with other users or resources, but that still rely on underlying wireless exchange of information. Positioning-related services encompass a growing segment of applications that provide location services to users, such as mapping, route determination, tracking, etc., that rely upon wireless interaction for execution.

Positioning-related services may include known user-related applications, such as visual representations of locations or routes that may be displayed for users while underlying wireless communication is used to determine current apparatus position, direction, orientation, etc. However, other uses such as user/object tracking, location-specific social networking and commercial messaging, enhanced visual recognition, etc. are now becoming available that makes the ability to determine apparatus position a desirable feature to provide in mobile apparatuses. Positioning may be implemented using a variety of available technologies. For example, devices may incorporate global positioning system (GPS) receivers to receive signals from satellites for formulating an absolute (fixed) coordinate position. Terrestrial technologies (e.g., earth based cellular signals or short-range wireless interaction), while not as exact, may also be relied upon to resolve an absolute or relative (e.g., with respect to a signal source) apparatus position.

While incorporating positioning technologies in a variety of apparatuses may be possible, the implementation may not always be practical. Positioning operations may create a strain on apparatus resources as the rate at which position information needs to be updated may vary depending on the resolution needed, the rate of position change, etc. Apparatuses that have ample processing and energy resources may still rely upon controls that limit processing and energy consumption. It is therefore foreseeable that the implementation of positioning services in apparatuses that may have more limited resources will present a challenge to designers. For example, desired applications such as user/object tracking may utilize mobile battery-powered apparatuses as beacons, sensors, etc. These devices may have extremely limited processing and communication ability, may not possess adequate size for dedicate positioning hardware and/or software, may not have the power capacity to support dedicated positioning operations, etc.

SUMMARY

Various example embodiments of the present invention may be directed to a method, apparatus, computer program product and system for providing positioning-related information within wireless communication signals. For example, an apparatus (e.g., acting as a tracker) may receive one or more messages advertising the presence of another apparatus (e.g., acting as a target). The advertisement messages may further comprise information indicating the availability of positioning-related information from the target apparatus. The tracker device may then determine, based on the received information, that positioning-related interaction with the target apparatus is available. If determined to be available, the tracker and target may interact with each other in order to initiate positioning-related information transmission. After receiving at least one message comprising positioning-related information from the target apparatus, the tracker apparatus may then determine at least one of a relative direction towards or from the target apparatus based on the received positioning-related information.

In at least one example implementation, the information indicating availability of positioning-related information received in the advertising message may further indicate at least one of whether the positioning services are configurable, a power at which messages comprising positioning-related information will be transmitted, location coordinates for the target apparatus and antenna array-related information for the target apparatus. If a determination is made that position-related interaction is supported, the interaction may comprise the tracker apparatus transmitting a message comprising configuration information to the target apparatus and receiving a message comprising response information from the target apparatus. Examples of configuration information may comprise a request for at least one of an amount of messages comprising positioning-related information to be transmitted, a time period during which messages comprising positioning-related information are transmitted, a type of positioning-related information, a transmission power for messages comprising positioning-related information, a transmission interval for messages comprising positioning-related information, and a channel map indicating channels to be used for transmitting messages comprising positioning-related information.

The target apparatus may respond to the configuration information by transmitting a message comprising response information. Examples of response information may comprise at least one of an amount of messages comprising positioning-related information to be transmitted, a time period during which messages comprising positioning-related information are transmitted, a type of positioning-related information, a transmission power for messages comprising positioning-related information, a transmission interval for messages comprising positioning-related information, and a channel map. At least one message comprising positioning-related information may then be transmitted from the target apparatus, wherein the positioning-related information may comprise information usable for determining the relative direction towards or from the target apparatus with respect to the tracker apparatus including, for example, at least one of a counter, a transmission power, an advertising channel activity indicator, an next channel indicator, a bit sequence and property information corresponding to the bit sequence.

In accordance with at least one embodiment of the present invention, an apparatus (e.g., acting as a target) may transmit at least one message via wireless communication, wherein the at least one message may advertise apparatus presence and may provide information indicating the availability of positioning-related information from the apparatus. The apparatus may then further transmit at least one message comprising positioning-related information. In at least one example implementation the information indicating the availability of positioning-related information in the advertising message may comprise at least a channel map indicating channels to be used when transmitting the at least one message comprising positioning-related information, which may further be transmitted on a Bluetooth Low Energy data channel.

The foregoing summary includes example embodiments of the present invention that are not intended to be limiting. The above embodiments are used merely to explain selected aspects or steps that may be utilized in implementations of the present invention. However, it is readily apparent that one or more aspects, or steps, pertaining to an example embodiment can be combined with one or more aspects, or steps, of other embodiments to create new embodiments still within the scope of the present invention. Therefore, persons of ordinary skill in the art would appreciate that various embodiments of the present invention may incorporate aspects from other embodiments, or may be implemented in combination with other embodiments.

DESCRIPTION OF DRAWINGS

The invention will be further understood from the following description of various example embodiments, taken in conjunction with appended drawings, in which:

FIG. 2B discloses an example of angle-of-departure (AoD) positioning in accordance with at least one embodiments of the present invention.

FIG. 3A discloses example advertising information and request packet structures usable with at least one embodiment of the present invention.

FIG. 3B discloses example response and broadcast packet structures usable with at least one embodiment of the present invention.

FIG. 4A discloses an example of AoD positioning-related information and the processing of positioning-related information in accordance with at least one embodiment of the present invention.

FIG. 4B discloses an example of AoA positioning-related information and the processing of positioning-related information in accordance with at least one embodiment of the present invention.

FIG. 5 discloses an example "indicating" application in which at least one embodiment of the present invention may be implemented.

DESCRIPTION OF EXAMPLE EMBODIMENTS

Figure 1A:
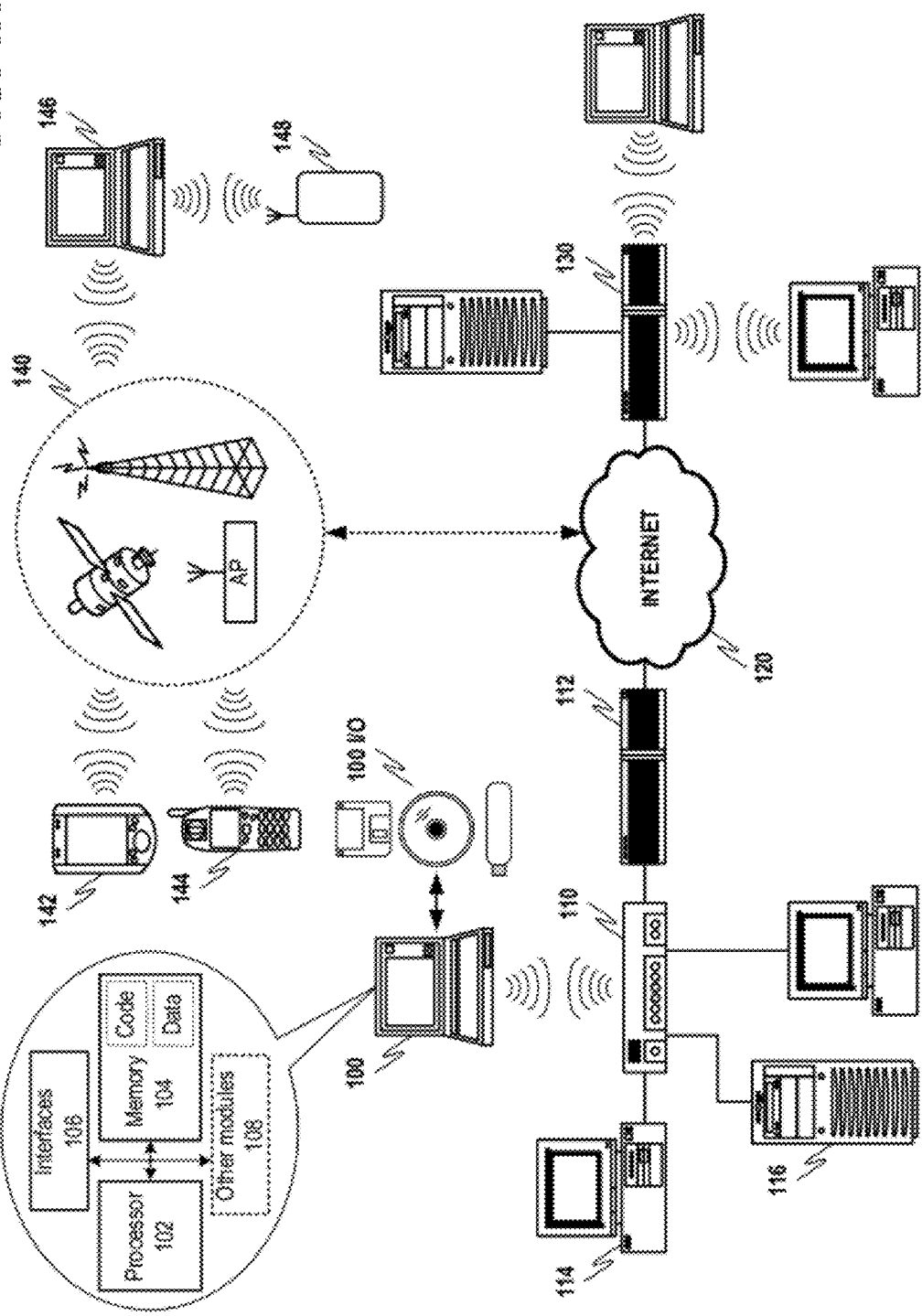
FIG. 1A discloses example apparatuses, systems, configurations, etc. that may be utilized when implementing the various embodiments of the present invention FIG. 1B discloses further detail regarding an example apparatus configuration that may be utilized when implementing the various embodiments of the present invention.

While the invention has been described below in terms of a multitude of example embodiments, various changes can be made therein without departing from the spirit and scope of the invention, as described in the appended claims.

I. Example System with which Embodiments of the Present Invention May be Implemented An example of a system that is usable for implementing various embodiments of the present invention is disclosed in FIG. 1A. The system comprises elements that may be included in, or omitted from, configurations depending, for example, on the requirements of a particular application, and therefore, is not intended to limit present invention in any manner.

Computing device 100 may be, for example, a laptop computer. Elements that represent basic example components comprising functional elements in computing device 100 are disclosed at 102-108. Processor 102 may include one or more devices configured to execute instructions. In at least one scenario, the execution of program code (e.g., groups of computer-executable instructions stored in a memory) by processor 102 may cause computing device 100 to perform processes including, for example, method steps that may result in data, events or other output activities. Processor 102 may be a dedicated (e.g., monolithic) microprocessor device, or may be part of a composite device such as an ASIC, gate array, multi-chip module (MCM), etc.

Processor 102 may be electronically coupled to other functional components in computing device 100 via a wired or wireless bus. For example, processor 102 may access memory 104 in order to obtain stored information (e.g., program code, data, etc.) for use during processing. Memory 104 may generally include removable or imbedded memories (e.g., non-transitory computer readable storage media) that operate in a static or dynamic mode. Further, memory 104 may include read only memories (ROM), random access memories (RAM), and rewritable memories such as Flash, EPROM, etc. Examples of removable storage media based on magnetic, electronic and/or optical technologies are shown at 100 I/O in FIG. 1, and may serve, for instance, as a data input/output means. Code may include any interpreted or compiled computer language including computer-executable instructions. The code and/or data may be used to create software modules such as operating systems, communication utilities, user interfaces, more specialized program modules, etc.

One or more interfaces 106 may also be coupled to various components in computing device 100. These interfaces may allow for inter-apparatus communication (e.g., a software or protocol interface), apparatus-to-apparatus communication (e.g., a wired or wireless communication interface) and even apparatus to user communication (e.g., a user interface). These interfaces allow components within computing device 100, other apparatuses and users to interact with computing device 100. Further, interfaces 106 may communicate machine-readable data, such as electronic, magnetic or optical signals embodied on a computer readable medium, or may translate the actions of users into activity that may be understood by computing device 100 (e.g., typing on a keyboard, speaking into the receiver of a cellular handset, touching an icon on a touch screen device, etc.). Interfaces 106 may further allow processor 102 and/or memory 104 to interact with other modules 108. For example, other modules 108 may comprise one or more components supporting more specialized functionality provided by computing device 100.

Computing device 100 may interact with other apparatuses via various networks as further shown in FIG. 1A. For example, hub 110 may provide wired and/or wireless support to devices such as computer 114 and server 116. Hub 110 may be further coupled to router 112 that allows devices on the local area network (LAN) to interact with devices on a wide area network (WAN, such as Internet 120). In such a scenario, another router 130 may transmit information to, and receive information from, router 112 so that devices on each LAN may communicate. Further, all of the components depicted in this example configuration are not necessary for implementation of the present invention. For example, in the LAN serviced by router 130 no additional hub is needed since this functionality may be supported by the router.

Further, interaction with remote devices may be supported by various providers of short and long range wireless communication 140. These providers may use, for example, long range terrestrial-based cellular systems and satellite communication, and/or short-range wireless access points in order to provide a wireless connection to Internet 120. For example, personal digital assistant (PDA) 142 and cellular handset 144 may communicate with computing device 100 via an Internet connection provided by a provider of wireless communication 140. Similar functionality may be included in devices, such as laptop computer 146, in the form of hardware and/or software resources configured to allow short and/or long range wireless communication. Further, any or all of the disclosed apparatuses may engage in direct interaction, such as in the short-range wireless interaction shown between laptop 146 and wireless-enabled apparatus 148. Example wireless enabled apparatuses 148 may range from more complex standalone wireless-enabled devices to peripheral devices for supporting functionality in apparatuses like laptop 146.

Further detail regarding example interface component 106 disclosed with respect to computing device 100 in FIG. 1A is now discussed regarding FIG. 1B. As previously set forth, interfaces 106 may include interfaces both for communicating data to computing apparatus 100 (e.g., as identified at 150) and other types of interfaces 170 including, for example, user interface 172. A representative group of apparatus-level interfaces is disclosed at 150. For example, multiradio controller 152 may manage the interoperation of long range wireless interfaces 154 (e.g., cellular voice and data networks), short-range wireless interfaces 156 (e.g., Bluetooth and WLAN networks), close-proximity wireless interfaces 158 (e.g., for interactions where electronic, magnetic, electromagnetic and optical information scanners interpret machine-readable data), wired interfaces 160 (e.g., Ethernet), etc. The example interfaces shown in FIG. 1B have been presented only for the sake of explanation herein, and thus, are not intended to limit the various embodiments of the present invention to utilization of any particular interface. Embodiments of the present invention may also utilize interfaces that are not specifically identified in FIG. 1B.

Multiradio controller 152 may manage the operation of some or all of interfaces 154-160. For example, multiradio controller 152 may prevent interfaces that could interfere with each other from operating at the same time by allocating specific time periods during which each interface is permitted to operate. Further, multiradio controller 152 may be able to process environmental information, such as sensed interference in the operational environment, to select an interface that will be more resilient to the interference. These multiradio control scenarios are not meant to encompass an exhaustive list of possible control functionality, but are merely given as examples of how multiradio controller 152 may interact with interfaces 154-160 in FIG. 1B.

II. Examples of Apparatus Positioning

Positioning in apparatuses may be supported, in whole or in part, through the use of combinations of hardware interfaces and/or software applications such as previously described with respect to FIG. 1A-1B. For example, Global Positioning System (GPS) receivers may be incorporated in apparatuses and may be integrated with the aforementioned apparatus resources for receiving signals that may be used to derive coordinates corresponding to apparatus location. However, the integration of a GPS receiver may not provide an ideal solution for all situations. For example, implementing a dedicated GPS receiver may require space for a receiver chipset along with processing/energy resources for operating the receiver, which may prove problematic in smaller/simpler apparatuses. GPS signals may also not be reliable, or even available, in some situations (e.g., when operating inside a structure like a building). As a result, having other modes of positioning available may prove beneficial for situations not well-suited for GPS.

Figure 2A:
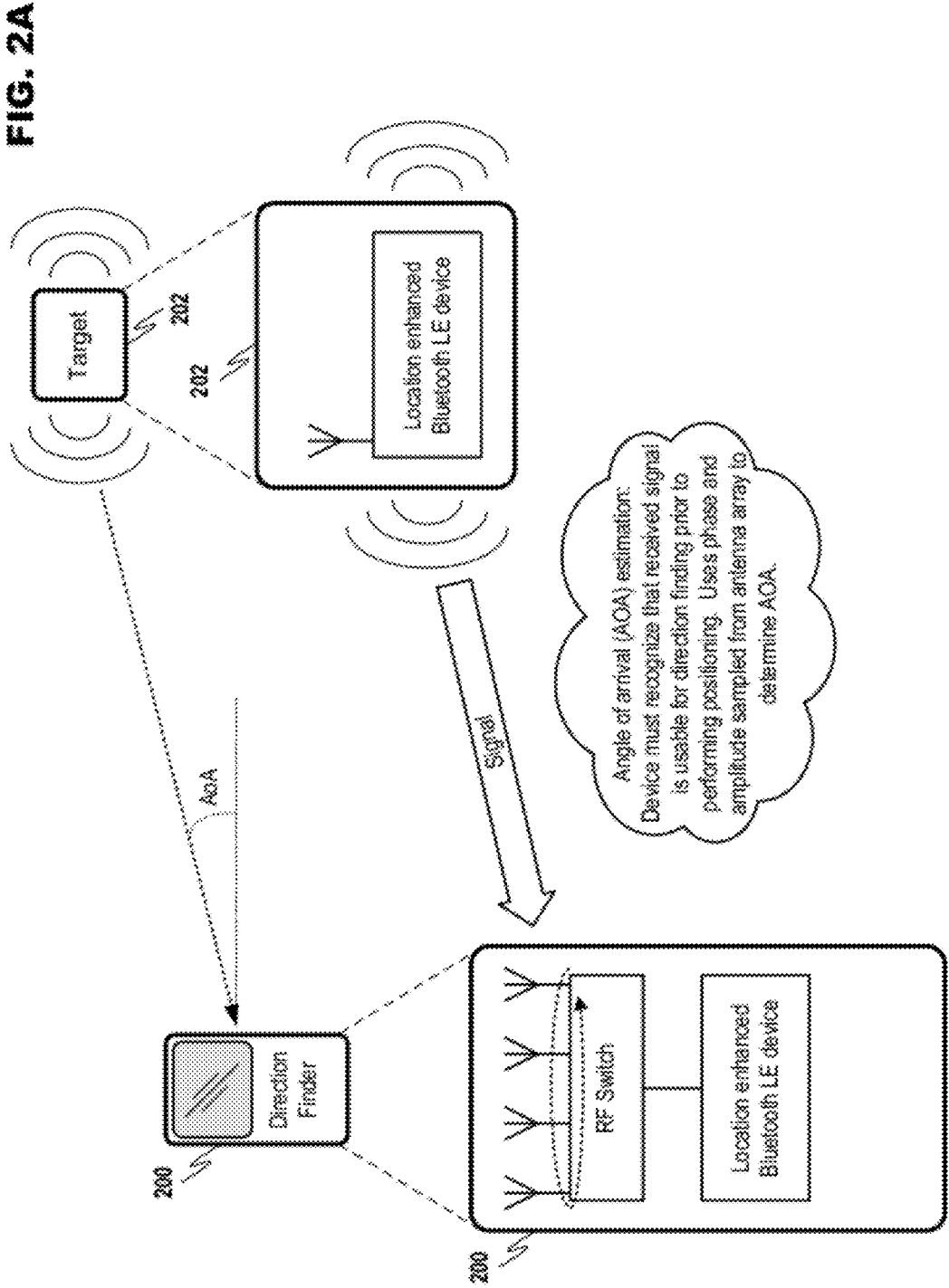
FIG. 2A discloses an example of angle-of-arrival (AoA) positioning in accordance with at least one embodiments of the present invention.

FIGS. 2A and 2B disclose two examples of electronic direction-finding that may be implemented in an apparatus. For the sake of explanation in these figures it is assumed that at least one of the apparatuses 200-206 may be "simple" in that the apparatus may possess limited space, processing and/or power resources, and thus, may communicate using a low power consumption/capacity wireless communication medium like Bluetooth Low Energy (Bluetooth LE). Bluetooth LE has been integrated into the Bluetooth Core 4.0 specification and provides a lightweight Link Layer capable of providing ultra-low power idle mode operation, simple device discovery, and reliable point-to-multipoint data transfer with advanced power-save and secure encrypted connections at the lowest possible cost. While various embodiments of the present invention will be described using Bluetooth LE, the use of this communication medium is not intended to limit the present invention. On the contrary, it is conceivable that the various embodiments of the present invention may be implemented using alternative wireless mediums.

FIG. 2A discloses an example scenario wherein apparatus 200 may estimate the angle of arrival (AoA) of a communication signal received from apparatus 202. In the course of this estimation, various amplitude and phase samples for the signal may be measured at each antenna in an antenna array residing in apparatus 200. Amplitude and phase measurements may be recorded by cycling an RF switch through each antenna in the array. Receiving apparatus 200 may then estimate an AoA for the signal using the recorded samples and parameters related to the antenna array. The antenna array parameters may pertain the composition, configuration and placement of antennas within the antenna array, and may be set in the device, for example, as part of the apparatus manufacturing process. As further set forth in FIG. 2A, apparatus 200 must be able to identify that a signal is usable for performing AoA estimation prior to initiating the process. The usability of a signal may depend on apparatus 200 knowing what signal content to measure, including at least the length of the signal content to measure and possibility even a bit pattern contained in the signal content. The ability to communicate this signal information, given the capacity limitations of Bluetooth LE as it currently exists, may be somewhat limited.

FIG. 2B discloses an example of apparatus 204 performing angle-of-departure (AoD) estimation for a signal transmitted from apparatus 206. In such a configuration apparatus 206 may transmit AoD enhanced packets and may execute antenna switching during the transmission of the packet. Apparatus 204 may scan for the AoD enhanced packets and may execute amplitude and phase sampling during reception of these packets. Apparatus 204 may then utilize the amplitude and phase samples, along with antenna array parameter information, to estimate the AoD of the packet from apparatus 206. In accordance with at least one embodiment of the present invention, some of the fixed parameters related to the physical configuration of the antenna array in apparatus 206 may be obtained from a remote resource, such as via a wired or wireless link to the Internet. Again, while the positioning solution provided in FIG. 2B allows for position estimation in an apparatus that may not contain its own dedicated position hardware and/or software, apparatus 204 must be aware that the packets in the signal transmitted by apparatus 206 are AoD enhanced packets prior to initiating the AoD estimation. Bluetooth LE, in its current form, does not provide an efficient vehicle for conveying this information to apparatus 204.

In order to communicate that information usable for direction finding is being transmitted, the data packets that are being used for direction finding must contain information that can be configured to indicate this purpose. However, if fields within the existing Bluetooth LE packet structure (e.g., the service field of Bluetooth LE advertising packet) are used for direction finding, the packet may be interpreted as erroneous by the cyclic redundancy check (CRC) at the receiver. This may be due in part to delay introduced by the antenna switching process that can confuse normal packet reception. Moreover "data whitening" (e.g., scrambling both the header and the payload of packet before transmission with a data whitening word in order to randomize, and thus distinguish, the data from highly redundant patterns and to minimize DC bias in the packet) that is employed in Bluetooth LE may further hinder the use of predetermined bit sequences for positioning since the bit sequences would be scrambled by the whitening algorithm and rendered unrecognizable. One possible solution to avoid CRC failure problems would be to not perform CRC checking when using a packet for positioning, as data decoding and error correction are not required for a signal being used for direction finding. This approach, however, may lead to other problems related to general data reception and correction. For example, as the address of the transmitting apparatus would not be checked with CRC, the possibly exists that the reliability of the data cannot be correctly established by the receiver.

III. Example Data Packets Modified to Include Positioning-Related Information

Readily available signals, and in more detail the featured packet structures, from standardized radios do not necessarily have long enough known signal sequences with beneficial properties to enable direction finding. Additionally, existing packet types that may be usable for positioning may not necessarily be exchanged in the right phase of the communication sequence. Proprietary solutions have limited applicability since wide industry support and interoperability would not be achieved. A standardized solution for providing positioning-related information may be more readily appreciated, and thus adopted, by users. In view of existing and foreseeable use cases served by Bluetooth technology, it would serve well as a direction finding signal carrier.

In particular, Bluetooth Low Energy (Bluetooth LE) radio technology is expected to become a common communication technology in mobile devices and various battery-operated devices like key tags. At the same time, there are many radio signal-based positioning use cases (e.g., direction finding) that would apply very well for mobile phone users and very low power devices. However, there is no support for positioning in current Bluetooth LE technology. The various embodiments of the present invention, as disclosed herein, are at least in part directed to providing positioning support on top of unicast connection between two Bluetooth LE devices. However, while Bluetooth LE technology provides a good basis from which to explain example embodiments of the present invention, the present invention is not limited to implementation with only Bluetooth LE technology, and may be implemented with other wireless technologies.

For example, two apparatuses may initiate wireless interaction, and through this interaction may determine whether positioning-related information is available in one or both apparatuses. If one or both devices are able to provide positioning-related information, various messages may be exchanged to, for example, configure the positioning-related information, to request transmission of the positioning-related information and to then transmit the positioning-related information. After receiving messages comprising the positioning-related information, one or both apparatuses may utilize the positioning-related information to determine apparatus position, for example, comprising a relative direction from the "tracker" apparatus towards the opposing or "target" apparatus. While labels such as "tracker" or "seeker" and "target" may be given to various apparatuses in the following disclosure, the following examples illustrate that, in some instances, apparatuses may serve dual roles. The following examples may also refer to positioning and/or direction finding (DF) interchangeably. The term "positioning" is considered to encompass a broader classification comprising, for example, one or more of direction finding, location determination, mapping, routing, etc. Therefore, the term positioning, for the sake of example herein, also includes direction-finding.

In accordance with at least one embodiment of the present invention, direction finding may be implemented over a receiver using packets comprising information usable for determining the relative direction towards or from a target apparatus with respect to a tracker apparatus including, for example, a known bit sequence. Standard packet structures may be defined for configuring the bit sequence (e.g., in situations where the bit sequence is configurable), for initiating bit sequence transmission and for carrying the bit sequences. Information indicating the availability of positioning—related information may be exchanged between two apparatuses, for example, within advertising messages. Information indicating the availability of positioning—related information may describe positioning functionality including, but not limited to, the positioning-related roles supported by each apparatus (target and/or seeker), bit sequence types supported by each apparatus such as Angle of Arrival (AoA) sequences, Angle of Departure (AoD) sequences and combined AoA and AoD sequences, whether the bit sequences are configurable, and if so, bit sequence lengths that are supported by each apparatus, bit sequence transmission rates, etc.

In response to learning the capabilities of the other apparatus, further messaging may take place wherein an apparatus in the seeker role (e.g., the apparatus receiving packets containing bit sequences) may attempt to configure packet transmission in the target apparatus. For example, if the seeker device determines that the bit sequence transmission is configurable, the seeker may transmit a positioning configuration message requesting a bit sequence type (e.g., AoA, AoD or combined AoA and AoD), a bit sequence length, a single bit sequence packet or a burst of multiple bit sequence packets, etc. A message may then be sent from the target to the seeker responding to the positioning configuration message, for example, by confirming the configuration that will be utilized for transmitting the messages comprising positioning-related information (e.g., packets containing bit sequences configured based on the positioning configuration message).

Now referring to FIG. 3A, example packet structures that are usable in advertising apparatus presence and for requesting positioning-related information configuration may comprise are disclosed at 300 and 306 respectively. The DF features of advertising packet 300 and DF_REQ packet 306 may be implemented in payload data units (PDUs) 302 and 308, respectively. PDU 302 may comprise a header and payload, the header being broken out in detail at 304 to include a 4-bit PDU type, 2 bits that are reserved for future use (RFU) followed by a Tx Add bit, an Rx Add bit, a 6-bit length field and two more RFU bits. The PDU type in header 304 may indicate, for example, an advertising packet type as a ADV_IND packet, an ADV_DIRECT_IND packet, a ADV_NONCONN_IND packet, or an ADV_SCAN_IND packet. Moreover, the 2-bit RFU at the end of header 304 may be designated to indicate that positioning-related information is available from the apparatus (e.g., DF REQ enabled). Moreover, DF_REQ packet 306 may have a similar structure as packet 300, except that the PDU type in header 310 may indicate that the packet comprises a request for configuration of positioning-related information. In such an instance, payload 312 of PDU 308 may be configured to comprise a 48-bit InitA field, a 48-bit AdvA field, and a variable length field containing the DFReqData (e.g., information corresponding to the requested configuration).

FIG. 3B discloses example packet structures corresponding to a message (e.g., DF_RSP) 314 for responding to messages requesting the configuration of positioning-related information (e.g., DF_REQ 306) and a message comprising positioning-related information (DF_BCST) 322. DF_RSP message 314 may comprise a similar structure to the messages disclosed in FIG. 3A except that the PDU type in the header 318 of PDU 316 may indicate the message type as "DF_RSP" and payload 320 of PDU 316 may comprise an 18-bit AdvA field and a variable-length field for conveying response information. DF_BCST message 322 may also be similar in structure to the example messages disclosed in FIG. 3A, but may have a PDU type that indicates a "DF_BCST" packet type and payload 320 of PDU 324 may comprise a 48-bit AdvA field, a 48-bit DF header field, and a variable length field for supporting dynamic positioning (e.g., barometer features).

In at least one example implementation, two RFU bits in PDU header 326 may be designated to serve as an AoA/AoD indicator. The AoA/AoD indicator being set to "00" may indicate to a receiving apparatus that no tail bits have been appended to the packet. In addition, the AoA/AoD indicator being set to "01" may indicate that AoA tail bits have been appended to the packet, "10" may indicate that AoD tail bits have been appended to the packet, and "11" may indicate that combined AoA and AoD tail bits have been appended to the packet.

FIG. 4A discloses an example of the content of DF_BCST packet 322 when configured for use in AoD direction finding. Initially, the AoA/AoD indicator in packet 322 may be set to "10" to indicate to a receiving apparatus that AoD information has been appended to packet 322. The positioning-related information added to packet 322 (e.g., after the CRC) may then comprise AoD positioning information as defined in the AoD length field. The bit sequence shown at 400 may comprise a waveform including, for example, pseudorandom, continuous wave, repeated patterns, etc., wherein the number of bits is shown from "1" to "k" in FIG. 4A. An example of antenna switching that may occur at the transmitter (Tx) during transmission of the packet is then shown under the bit numbers, which is then followed by an example of phase and amplitude sampling that may occur at the receiver as the packet is received by the direction finder. Some or all of the information disclosed in FIG. 4A may be utilized by the receiving apparatus to estimate the angle of departure the packet took from the transmitter.

In another example, FIG. 4B discloses a scenario where DF_BCST packet 322 is configured for AoA direction finding. In this instance the AoA/AoD indicator is set to "01" to indicate to a receiving apparatus that the packet contains AoA positioning information. The positioning-related information appended to the packet may be configured as set forth at 402, wherein the length of the AoA field is defined in the AoA length field with the header of the packet PDU. Similar to the example of FIG. 4A, a waveform including, for example, pseudorandom, continuous wave, repeated patterns, etc. of bits may be transmitted in the packet, and may be transmitted and sensed as shown. At least one difference may be noted in the example of FIG. 4B as compared to FIG. 4A wherein the antenna switching occurs at the receiving device (Rx) instead of the transmitting apparatus since the antenna array is located in the receiver. The phase and amplitude sampling for each bit 1 to N may also occur at the receiver as shown in FIG. 4B.

Figure 4C:
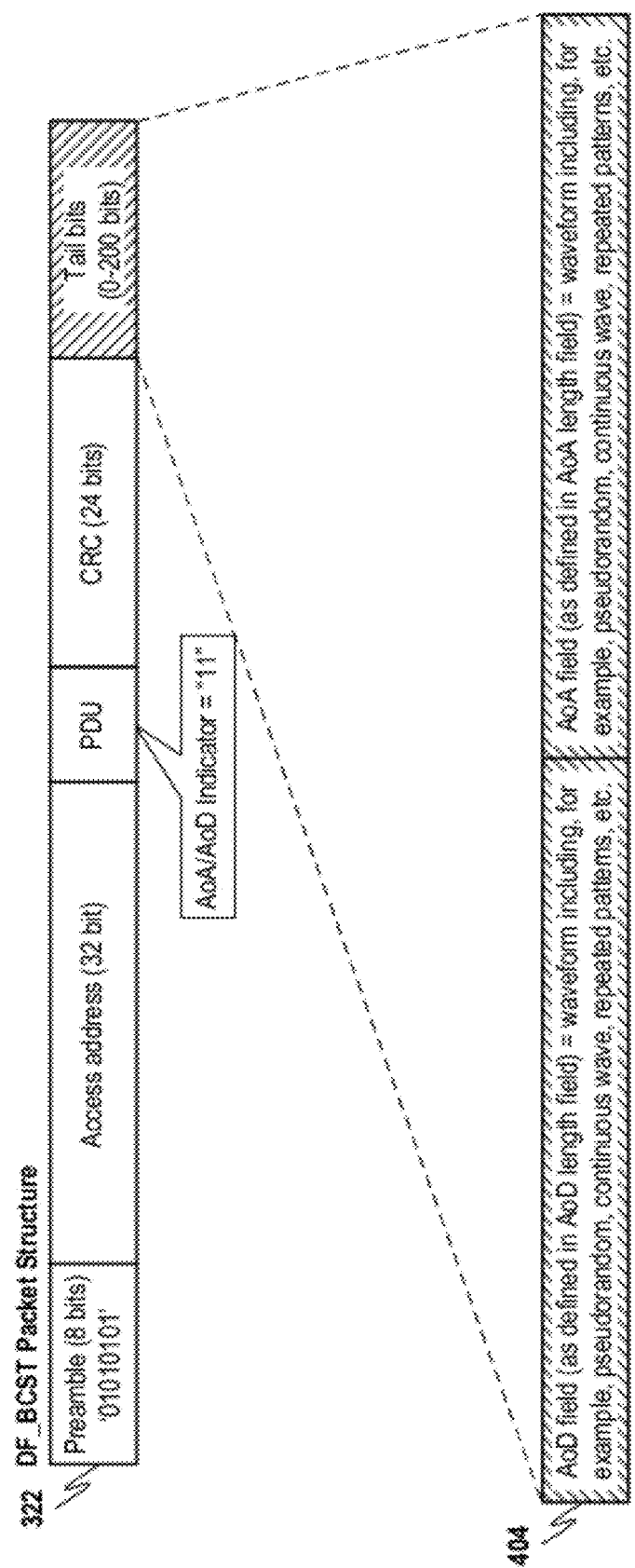
FIG. 4C discloses an example of combined positioning-related information in accordance with at least one embodiment of the present invention.

FIG. 4C discloses another example of DF_BCST packet 322 when it is configured to include positioning-related information for use in both AoA and AoD direction finding. In this example the AoA/AoD indicator may be configured to "11" to indicate to receiving devices that the packet contains both AoA and AoD positioning information. Example positioning-related information is then disclosed at 404 including both AoA and AoD information in the packet after the CRC. In this instance the packet may also contain length information that sets forth the length of both the AoA and AoD information individually so that receiving devices may know when the AoA bit sequence ends and the AoD bit sequence begins.

IV. Example Usage Scenarios

The various embodiments of the present invention may be implemented in many different applications in order to support position (e.g., location) and/or direction (e.g., tracking) related functionality. FIG. 5 discloses a first example usage scenario wherein an indicating or "pointing" operation is disclosed. A user (e.g., a tourist) who possesses wireless communication device 500 may be presented with a plurality of visual exhibits 502 (e.g., posters, advertisement, paintings, etc.). Each of the visual exhibits 502 is associated with a nearby wireless tag or target device 504. While visiting the Musée du Louvre in Paris, the tourist may "point" at the famous painting of the "Mona Lisa" using wireless communication device 500. Instead of triggering a major security alarm, the tourist may receive information regarding the Mona Lisa via wireless communication device 500. Tag 504, residing proximate to the painting of interest, may provide the desired information to wireless communication device 500, or alternatively, may provide an identifier (e.g., a URL) for a location from which the desired information may be obtained.

It is convenient that wireless communication device 500 detects only tag 504 to which it is pointed, and not any other tag in the same room. Also, it is convenient that the tourist does not need to come into physical contact with tag 504, and instead may interact with tag 504 from some meters distance. In this way tags 504 may be situated near objects 502 of interest in order to facilitate logical association with object 502, but users need not be close to object 502 during interaction with the tag, which helps to protect object 502. Remote interaction may also aid in the user experience for all users, since bottlenecks that might occur if multiple users were to need or desire to physically contact tag 504 at substantially the same time is avoided.

In accordance with at least one embodiment of the present invention, positioning-related interactions between apparatuses, such as described in FIG. 5, may be orchestrated using wireless advertising and data packets defined with a particular wireless communication medium (e.g., Bluetooth LE). For example, apparatuses that "advertise" their presence (e.g., wirelessly notifying other apparatuses of their presence) may transmit advertising channel messaging that both identifies the advertising apparatus and provides information indicating the availability of positioning-related information in the advertising apparatus. Information that may be provided in advertising messages may comprise whether direction-finding (DF) request message exchange is enabled in the advertising apparatus, whether the advertiser's DF messaging is configurable (e.g., by an apparatus acting in scanner/tracker role), a transmission power (e.g., that may be utilized for received signal strength indication (RSSI) based range estimation). Optionally, advertising messages may comprise location coordinates for the transmitting apparatus and antenna array related information of the transmitter. Location coordinates may be useful when the advertising apparatus is fixed (e.g., an Access Point or AP) being used in a navigation application. Antenna information for the advertising apparatus may be useful for the receiving apparatus when, for example, the receiving device is performing angle of departure (AoD) direction estimation.

After receiving an advertising message comprising some or all of the above information, an apparatus acting in a tracker/seeker role may determine whether positioning-related information is available from the advertising apparatus, and moreover, whether the positioning-related information is configurable. If positioning-related information is determined to be both available and configurable, a message comprising a request for configuration of the positioning-related information may be sent from the tracker apparatus to the advertising (e.g., target) apparatus requesting configuration of the positioning-related information and/or messages comprising the positioning-related information. For example, a request for configuration of the positioning-related information may request a particular transmission scheme: a certain number or duration of messages, a tail type (e.g., a bit sequence usable for AoA estimation, AoD estimation, or combined AoA/AoD bit sequences), a channel usage map (e.g., to support channel hopping), a message transmission power level, and a message transmission interval. In addition, the configuration information may also comprise a request to identify the scanner for advertiser's white list filter (e.g., the list of apparatuses with which the advertiser will interact). The advertising apparatus may then transmit a response message comprising some or all of the information categories that were requested by the tracker apparatus with the request for configuration of positioning-related information. If the advertising apparatus is able to conform with the behavior requested by the tracker apparatus, it may transmit back the same information it received from the tracker apparatus. Otherwise, the advertising apparatus may transmit back a "default" configuration that will be utilized for transmitting the positioning-related information.

The advertising apparatus may then proceed to broadcast messages comprising positioning-related information on the advertising channel or data channel(s) (e.g., according to a fixed configuration or based on the scheme established in the previous configuration transaction). The messages comprising positioning-related information may comprise a counter (e.g., indicating the count of the current positioning-related information message in situations where a certain number of messages were requested), a transmission power of the current message, which may change from packet to packet, an indication as to whether advertising channel operation is simultaneously active (e.g., advertising channel messages are still being transmitted), an indication as to whether the next positioning-related information message is on advertising channel (e.g., for channel hopping), a bit sequence and an indication of various characteristics of the bit sequence (e.g., type, length, etc.)

Figure 6:
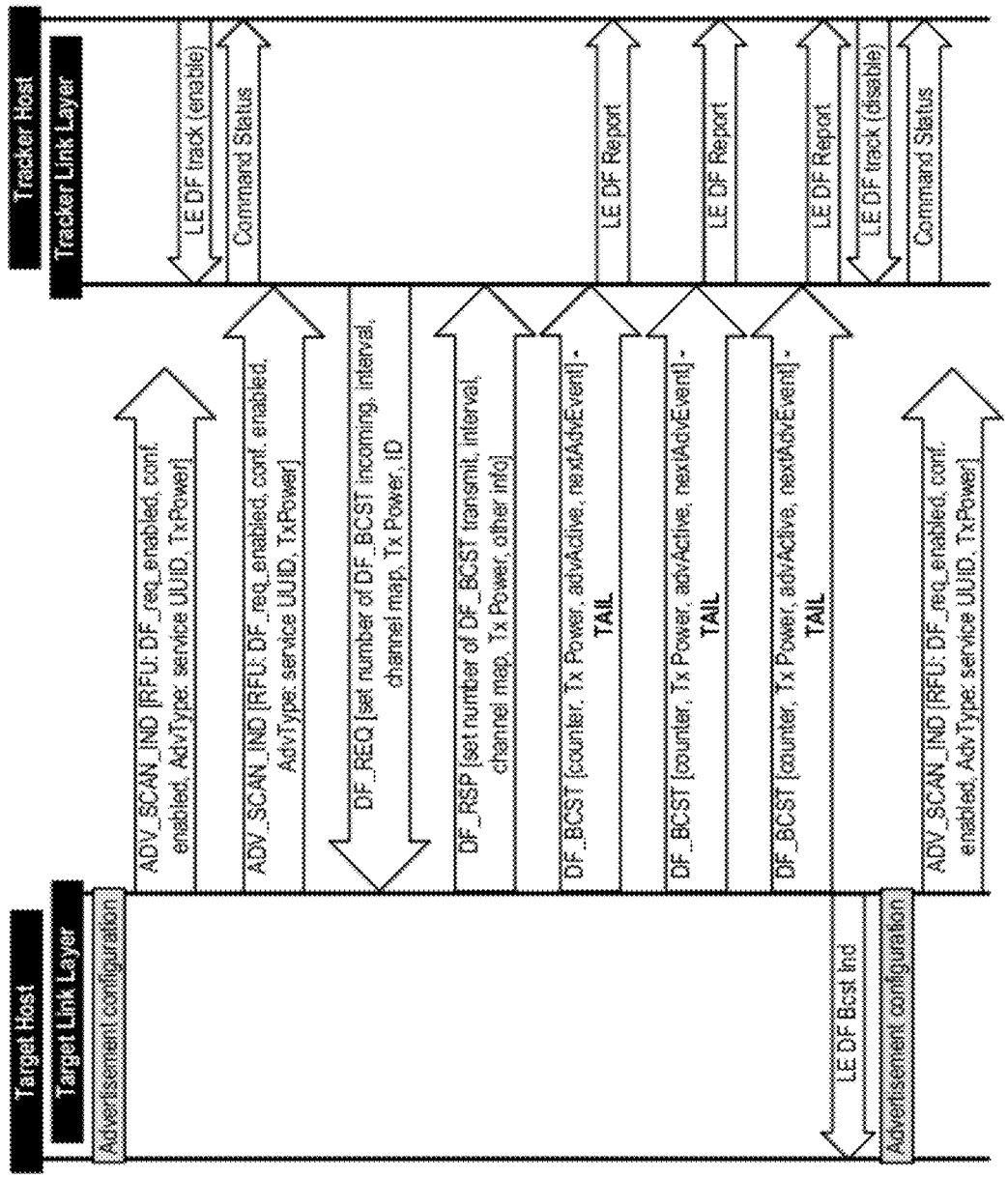
FIG. 6 discloses an example apparatus interaction via wireless communication in accordance with at least one embodiment of the present invention.

In accordance with various example implementations, communication between an advertising apparatus (e.g., a target apparatus) and a seeker/tracker apparatus may be one-way (e.g., in the form of non-configurable broadcasts) or two way wherein the target and tracker may interact to configure positioning. FIG. 6 discloses an example two-way interaction scenario that may be usable in situations such as described with respect to FIG. 5. The target apparatus may comprise a target host (e.g., comprising upper-level functionality) and a target link layer (e.g., comprising lower-level communication operations). The tracker apparatus may also comprise a tracker host and a tracker link layer. In ordinary communications, advertisement configuration may occur in apparatuses seeking to interact with other apparatuses (e.g., the target apparatus) and may be followed by transmission of advertising packets (e.g., ADV_SCAN_IND) inviting other apparatuses to interact with the target apparatus. Current RFU bits in the headers of the advertising packets may now be assigned to indicate the availability of positioning-related information (e.g., DE_req_enabled) and that these positioning services are configurable (e.g., "conf. enabled"). Other information that may be providing in the ADV_SCAN_IND packet may comprise an identification for the service that is usable for identifying the service, and its possible variants, at the host level ("service UUID") and a transmission power for packets comprising positioning-related information.

After the host enables tracking resources in the tracking apparatus by issuing a LE DF track (enable) command, which may be confirmed by the tracking link level by a command status response, the tracking apparatus may receive the ADV_SCAN_IND packets transmitted by the target link level. In this example, the information in the advertising message indicates that positioning-related information is available and configurable in the target apparatus, and so a DF_REQ message may be sent to the target apparatus, the DF_REQ comprising a requested configuration for positioning-related information transmitted from the target apparatus. The DF_REQ message in this example requests a certain number of messages comprising positioning-related information to be transmitted at a certain interval. The tracking apparatus is operating in accordance with a channel-hopping scheme, and so a channel map is also provided in the request along with a requested transmission power and a device ID (e.g., which may be important if the target apparatus is handling multiple requests for positioning-related information transmitted from multiple tracking apparatuses).

A DF_RSP may then be transmitted by the target apparatus in a response to the DF_REQ received from a tracking apparatus. The DF_RSP message may confirm the settings that will be used in transmitting messages comprising positioning-related information. In confirming the settings, the tracking apparatus may simply provide the setting information that will be utilized in sending the messages comprising positioning-related information. DF_BCST packets may then be transmitted in accordance with the previous configuration interaction. In the example disclosed in FIG. 6, the DF_BCST packets may be sent on a data channel(s) instead of advertising channel(s) as established by the channel map information. DF_BCST packets may comprise, in addition to the bit sequence used for direction finding, a counter indicating a count of the current message comprising positioning-related information (e.g., since a set number of messages was requested during configuration), a transmission power of the packet that may be used in the receiving apparatus to, for example, filter out transmissions received from other possible targets in the area or may estimate distance to the target apparatus, an indicator that advertising is still active on the advertising channel and an indication of the channel on which the next packet will be sent and any other relevant information. Each message that is received from the target apparatus may result in an LE DF Report message being transmitted from the tracker link layer to the tracker host. For example, raw positioning-related information may be reported to the host layer, which processes the raw positioning-related information into apparatus position information (e.g., a AoA or AoD estimation indicating the relative direction towards/from the target apparatus). Alternatively, some or all of the processing of the raw positioning-related information may occur in the link layer, and estimated results based on the received positioning-related information are then reported to the master host layer. In FIG. 6, this process may continue until the set number of messages comprising positioning-related information have been transmitted. If the apparatus position (e.g., a relative direction from the tracker apparatus to the target apparatus) has been established successfully, then the tracking resources in the tracker apparatus may be deactivated by a LE DF track (disable) that is issued by the tracker apparatus host layer to the link layer (and which is confirmed by the link linker with a command status message). On the target side, the target apparatus link layer may inform the target apparatus host layer that current message comprising positioning-related information transmission task is complete via a LE DF Bcst Ind message, and may resume advertising (e.g., if advertising was paused during transmission of the messages comprising positioning-related information). In accordance with at least one embodiment of the present invention, a tracker apparatus may reengage positioning with a target apparatus if, for example, positioning was unsuccessful (e.g., if, based on the count, a message was not received), the tracking apparatus has moved, etc.

Figure 7:
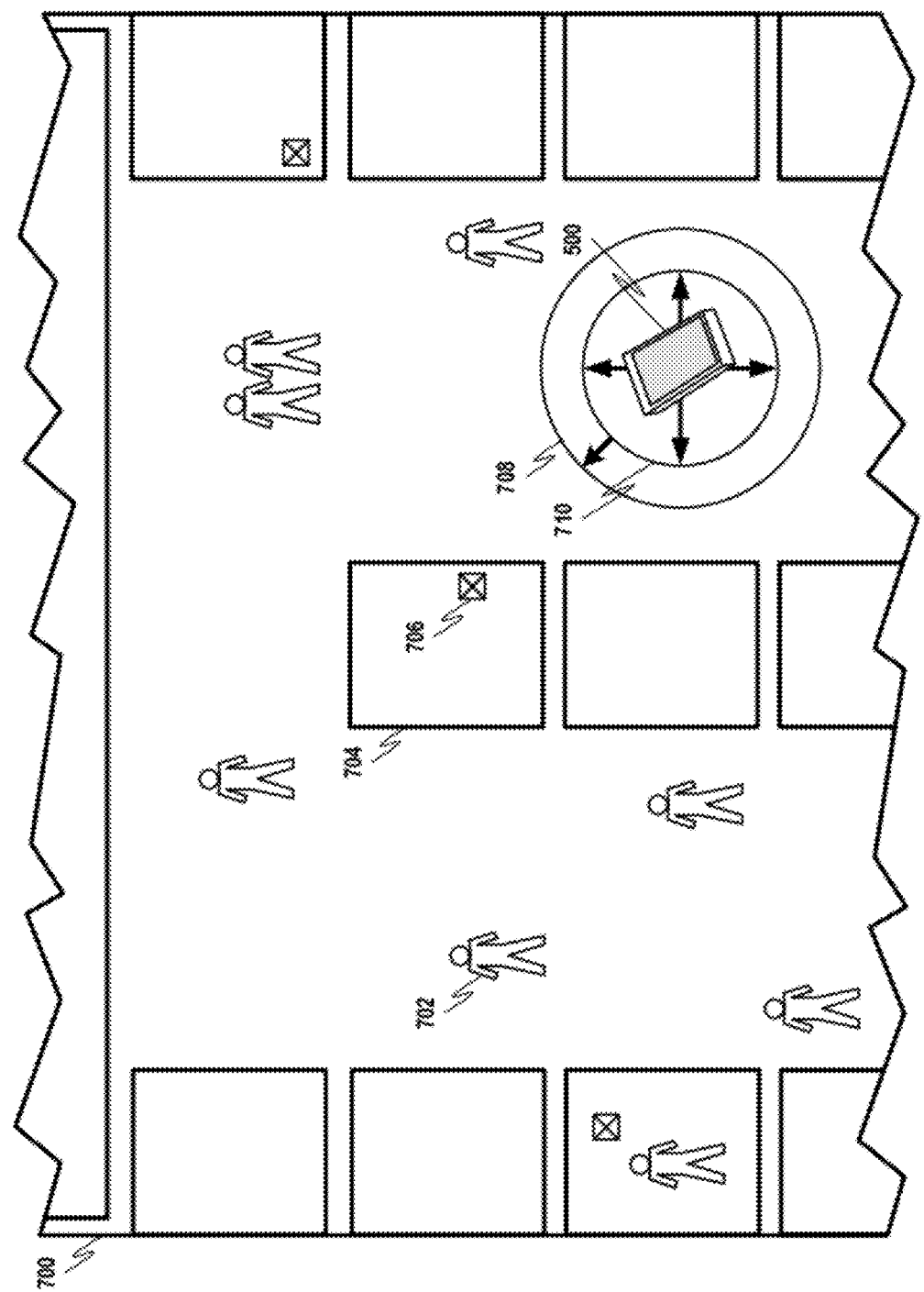
FIG. 7 another example "tracking" application in which at least one embodiment of the present invention may be implemented.

Another example application in which at least one embodiment of the present invention may be employed is disclosed in FIG. 7. In this situation a user may visit a location 700 (e.g., a shopping center). Example shopping center 700 may comprise one or more people 702 (e.g., customers) visiting various establishments 704 (e.g., stores, restaurants, kiosks, etc.) that comprise items of interest 706. Again, the user is in possession of wireless communication device 500, and may desire to use device 500 to find items of interest 706 within shopping center 700. For example, a "local radar" application 708 on wireless communication device 500 may be employed. Local radar application 708 may present advertisements of various traceable items of interest 706. The user of wireless communication device 500 may select an advertisement in local radar application 708, which may then indicate which direction to walk to get to item 704. This same process may also occur with other customers 702 that are also interested in item 704.

Simultaneously, customers 702 may also want to navigate within shopping center 700 (e.g., to view their current position relative to fixed navigation information such as a map of shopping center 700). In this instance wireless communication device 500 may perform more than one positioning operation, such as navigating in shopping center 700 by determining the position of device 500 with respect to various fixed targets (e.g., access points) as represented at 710 in FIG. 7, as well as indicating a relative direction towards particular targets (e.g., items of interest 706). In navigating around shopping center 700, wireless communication device 500 may receive navigation information (e.g., map information indicating locations for various access points in shopping mall 700) upon entering the location. The navigation information may be used to identify the sources of signals encountered while in shopping center 700, and after estimating a position for wireless communication device 500 relative to the signal source, in accordance with at least one embodiment of the present invention, to determine a location for device 500 relative to the navigation information (e.g., relative to a map of shopping center 700).

The example usage scenario disclosed in FIG. 7 may also be reversed. In another example situation, FIG. 8 again discloses location 700 as shopping center. The management of shopping center 700 may desire to monitor customer satisfaction. For example, by tracking how customers 702 move about shopping center 700, areas for improvement may be identified, such as needed improvements for customer conveyances (e.g., escalators, elevators, stairs, etc.), good locations for advertisements/signage, possibly customer safety concerns, etc. For this purpose, the management may attach target tags 800 to shopping trolleys and baskets that are utilized by customers 702. The management may then employ a location system 802 to track the movement of tags 800 within shopping center 700. Location system 802 may track movement, for example, by periodically sampling the locations of various tracking tags 800 within the shopping center 700. This information may be compiled to show statistical concentrations of customer traffic.

Figure 8:
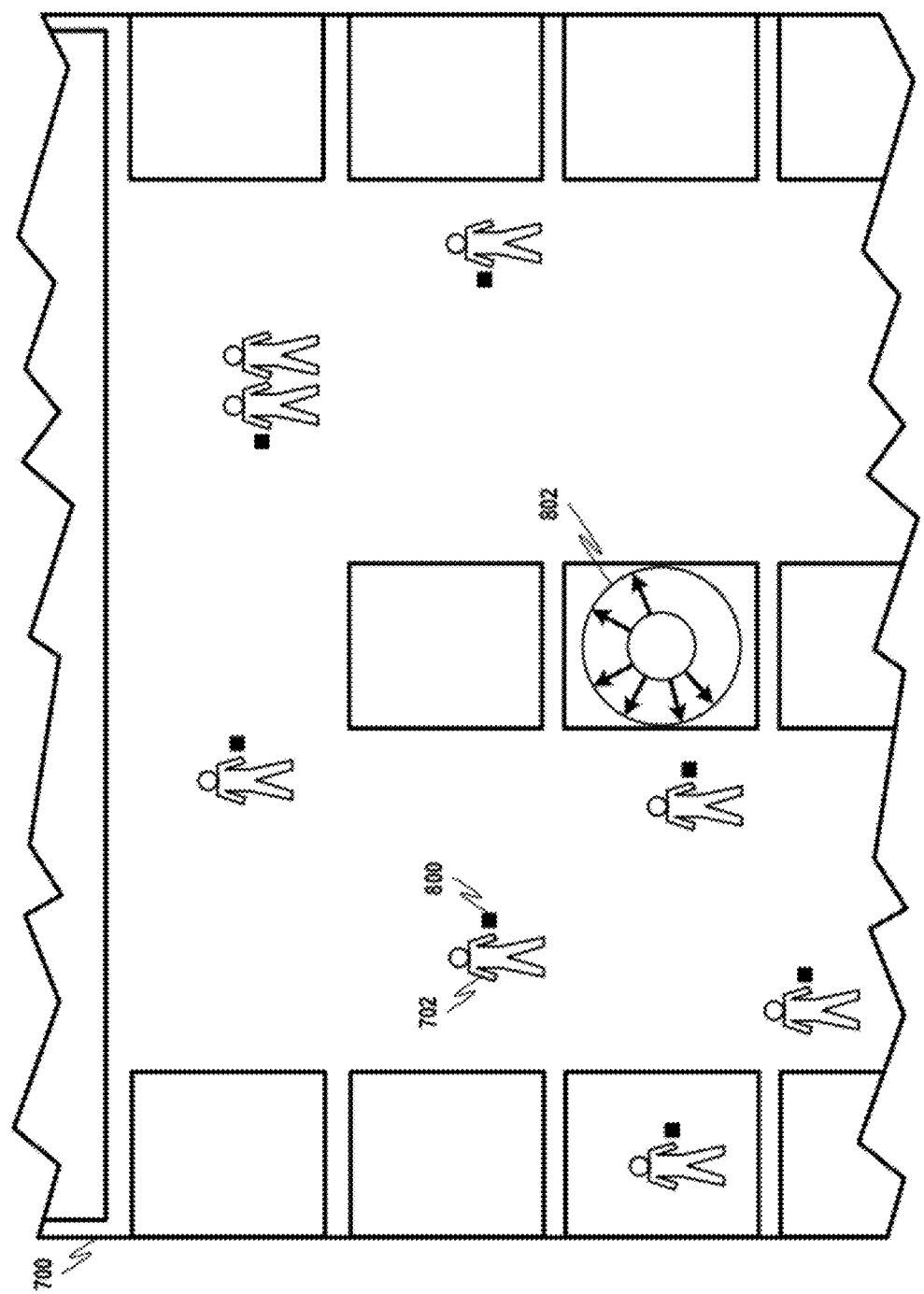
FIG. 8 a third example "locating" application in which at least one embodiment of the present invention may be implemented.
Figure 9:
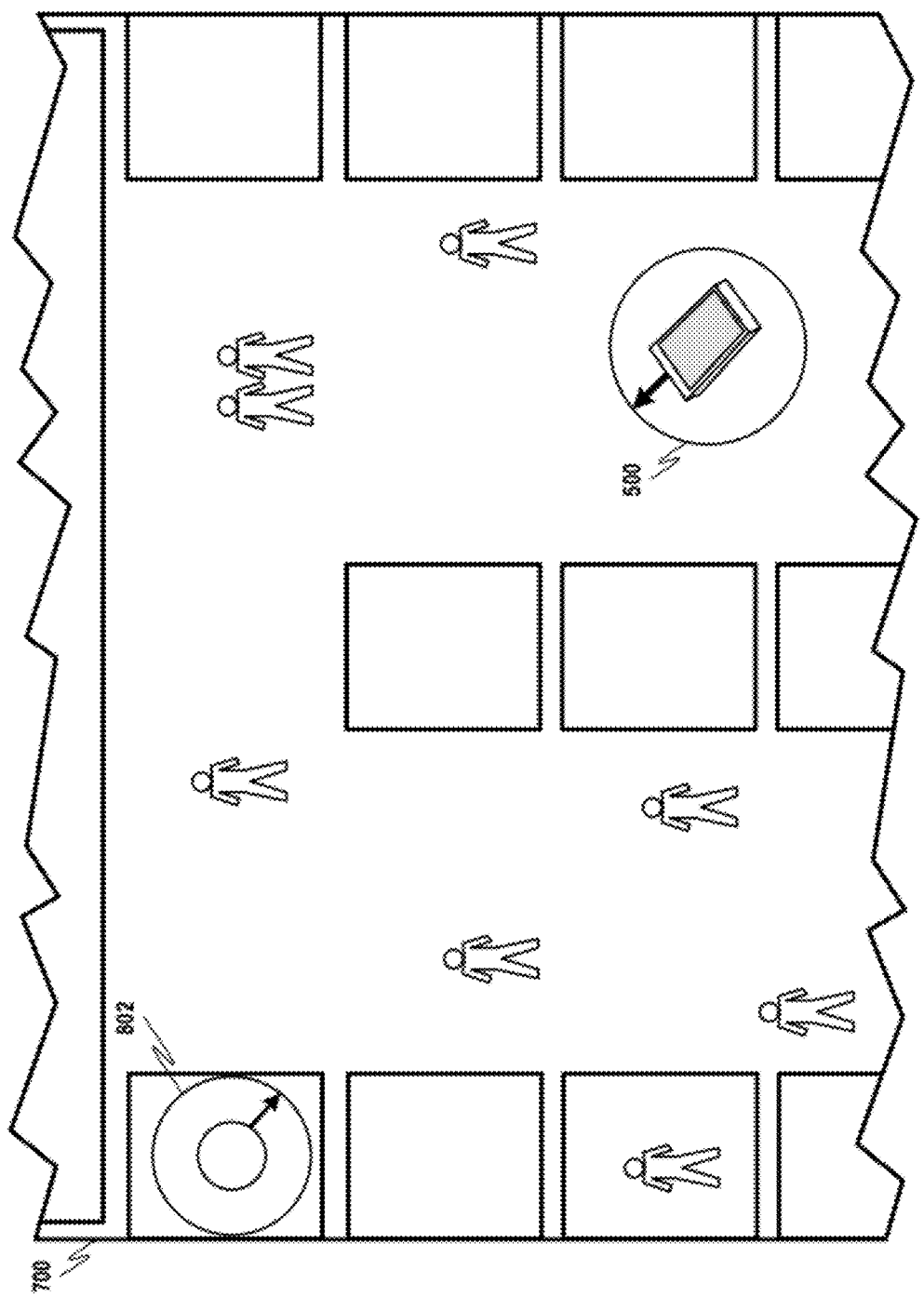
FIG. 9 a fourth example "tracking and locating" application in which at least one embodiment of the present invention may be implemented.

Another example usage case may employ tracking on the part of both apparatuses that are involved in a positioning transaction. In the example of FIG. 9, location 700 may be an airport instead of a shopping center. A traveler, again possessing wireless communication device 500, may be in airport 700 for the first time, and may not know the way to get to a connecting gate. The traveler may have navigation information for airport 700 in wireless communication device 500 (e.g., a map including fixed access point references) and an application that may represent the location of the traveler with respect to the map (e.g., based on the various example positioning operations disclosed herein) and also the direction the traveler should go to get to the connecting gate. In this first aspect of FIG. 8 wireless communication device 500 is the tracker apparatus and the fixed access points in airport 700 are target apparatuses. Also, the staff at the connecting gate may track wireless communication 500 (e.g., and other travelers heading for the same flight) for managing the departure. In the second aspect of FIG. 8 wireless communication device 500 is the target apparatus and tracking resources in airport 700 are tracker apparatuses.

Figure 10:
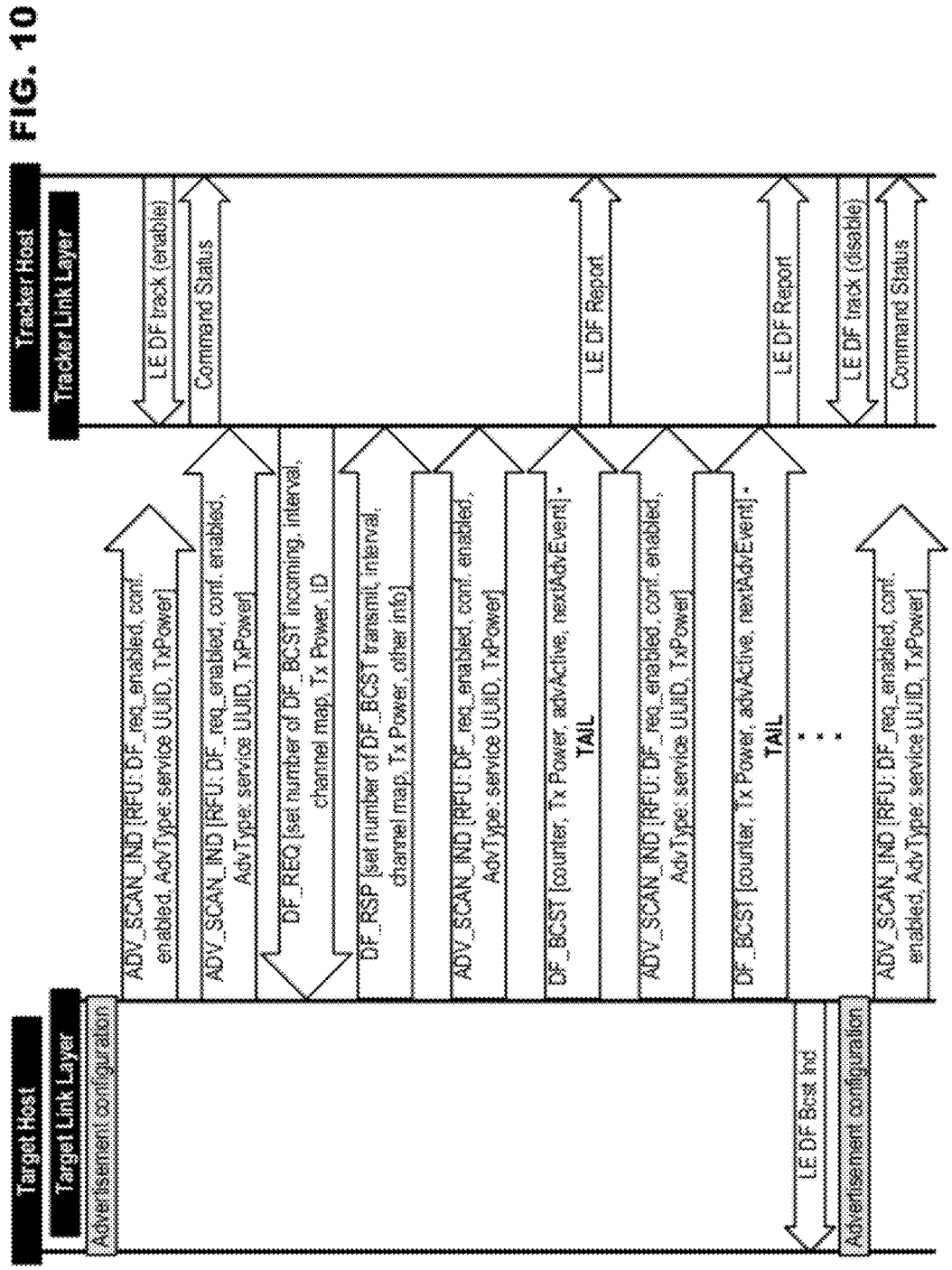
FIG. 10 discloses another example apparatus interaction via wireless communication in accordance with at least one embodiment of the present invention.

In accordance with at least one embodiment of the present invention, a wireless interaction similar to FIG. 6 is disclosed in FIG. 10, but the positioning-related information transmission scheme differs in that the messages comprising positioning-related information (e.g., DF_BCSTs) may be sent on longer, regular intervals (e.g., once every 100 ms). Such a mode of operation may be more suitable for higher user traffic situations such as disclosed in FIG. 7-9. In such instances the transmission of messages comprising positioning-related information may be indicated as time (e.g., duration) instead of certain number of DF_BCST transmissions. An indication of advertising still being active (e.g., "advActive" indicator in each DF_BCST) and an indication of the next message from this device being ADV_SCAN_IND (e.g., nextAdvEvent in each DF_BCST indicate that the next message is ADV_S-CAN_IND) becomes more relevant in this example compared to example of FIG. 6 since more apparatuses are being serviced. For example, another tracker device may receive an interspersed advertisement message and may start listening to ongoing DF_BCST broadcasting. The target apparatus may not change the DF_BCST transmission scheme when another tracker apparatus joins (e.g., and transmits a DF_REQ packet to the target apparatus), except that it may continue the transmission scheme longer. In this way a target apparatus is less likely to become overtaxed by attempting to provide custom positioning-related information for every tracker apparatus.

Figure 11:
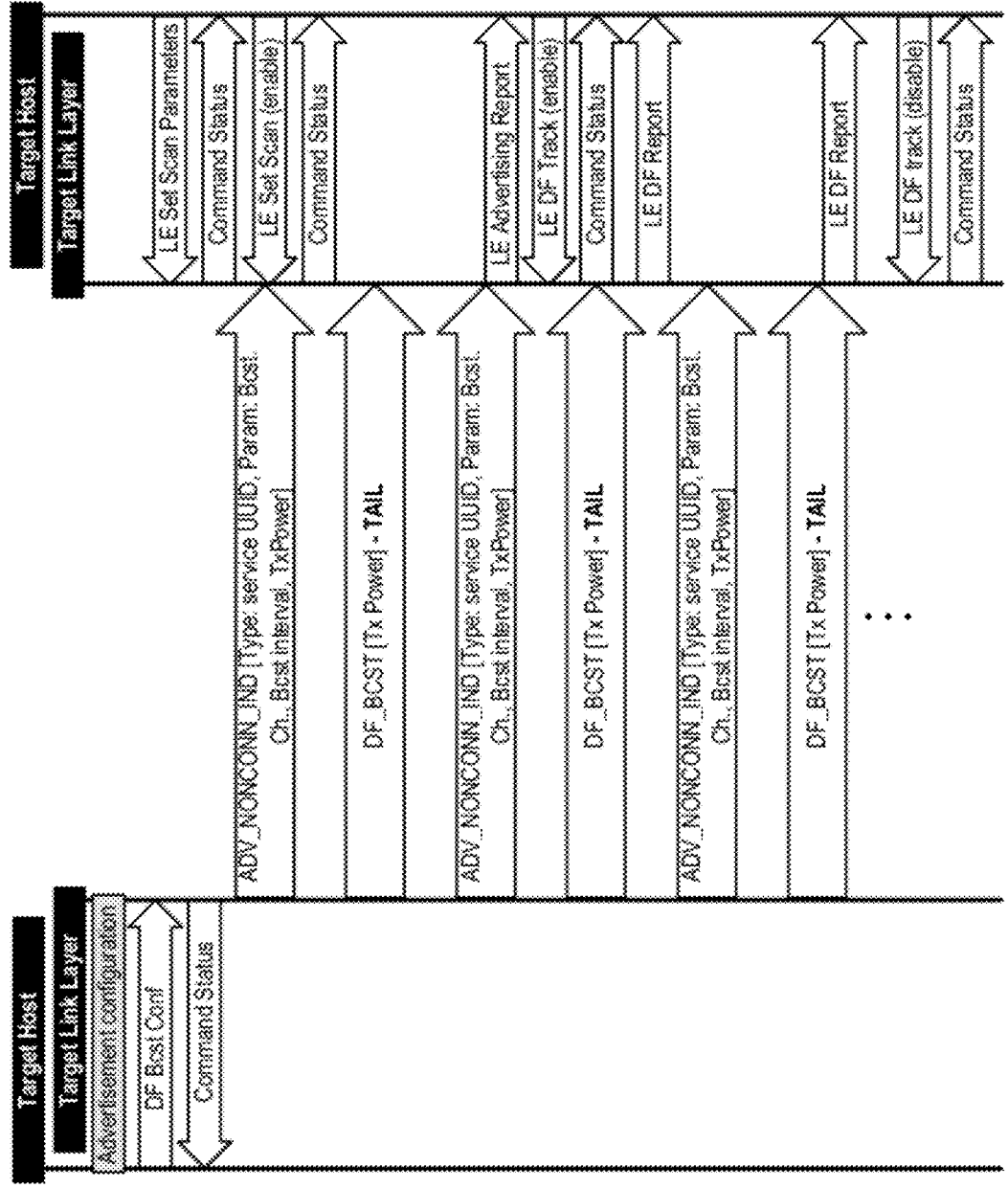
FIG. 11 discloses a third example apparatus interaction via wireless communication in accordance with at least one embodiment of the present invention.

FIG. 11 discloses an example implementation, in accordance with at least one embodiment of the present invention, wherein a one-way communication provides a broadcast-only interaction. In FIG. 11 there is no intention to make the target apparatus connectable or configurable by tracking apparatuses. Instead, the target apparatus may utilize the information supplied in ADV_NONCONN_IND packets on advertising channel to announce DF_BCST broadcasting scheme. For example, information indicating the availability of positioning-related information comprised within the ADV_NONCONN_IND message may indicate the service UUID, that the positioning related information is non-configurable, broadcasts on a fixed channel (e.g., "Param: Bcst. Ch."), at a fixed interval (e.g., "Bcst interval") and at a fixed power level (e.g., "Tx Power"). Upon receiving advertising messages with information indicating the availability of positioning-related information such as shown in FIG. 11, tracking apparatuses may understand the broadcast-only configuration of the target apparatus (e.g., as shown by the tracker link layer sending a LE advertising report message to the tracker host) and may not try to configure the target apparatus (e.g., tracker apparatuses will not transmit DF_REQ messages to the target apparatus). Instead, tracking apparatuses may simply listen to the fixed advertising and/or broadcast channels to receive ADV_NONCONN_IND and/or DF_BCST packets. The configuration disclosed in FIG. 8 provides the lightest burden for the target apparatus in that no custom configuration is required. The target apparatus must simply transmit advertisement and messages comprising positioning-related information, which may be beneficial in situations where the target apparatus is resource limited (e.g., rudimentary processing abilities, battery powered, etc.) or will encounter a large number of tracking apparatuses (e.g., in large-scale indoor navigation systems).

Figure 12:
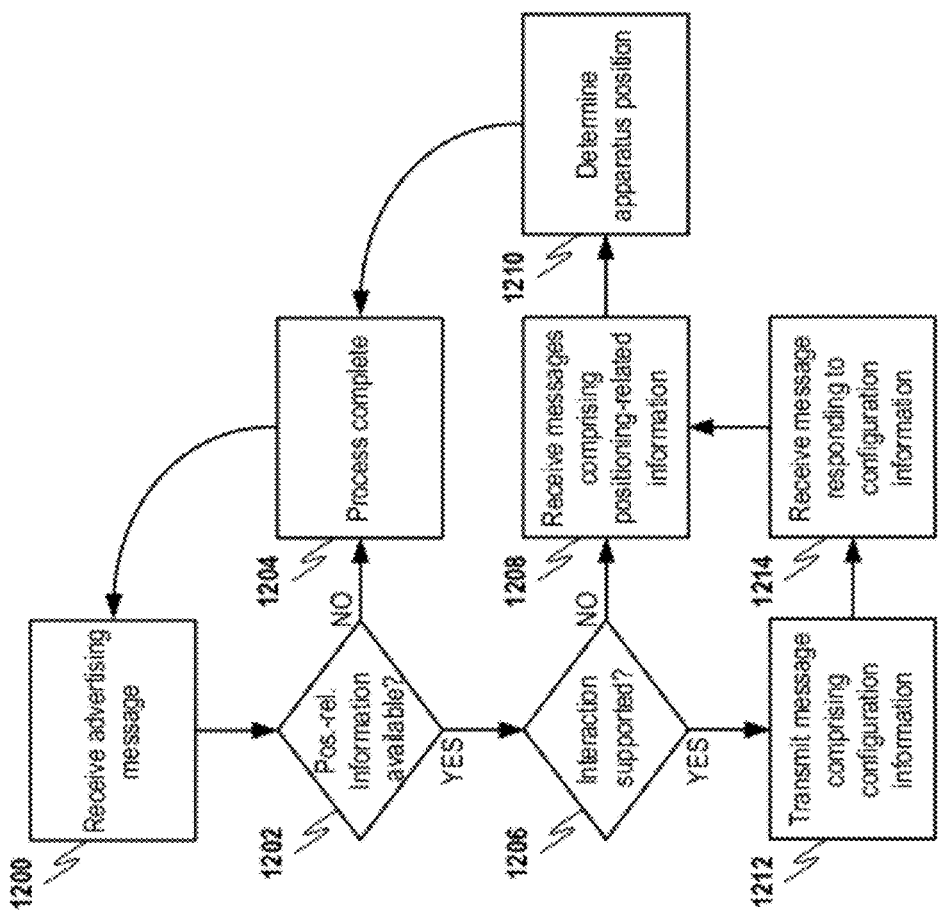
FIG. 12 discloses a flowchart of an example communication process from the perspective of an apparatus acting in tracker role in accordance with at least one embodiment of the present invention.

A flowchart of an example communication process from the perspective of an example apparatus acting in the role of tracker, in accordance with at least one embodiment of the present invention, is now disclosed with respect to FIG. 12. The process may initiate in step 1200 wherein an advertising message is received in an apparatus. Advertising messages may indicate the presence of another apparatus that is available for wireless interaction and may also comprise information indicating the availability of positioning-related information from the other apparatus. In step 1202 a determination may be made, based on the received positioning service information, as to whether positioning-related information is available from the advertising apparatus. If it is determined that positioning-related information is not available from the advertising apparatus, then the process may be complete in step 1204 and may reinitiate in step 1200 in preparation for further advertising messages to be received in the apparatus.

If in step 1202 a determination is made that positioning-related information is available, then in step 1206 a further determination may be made as to whether positioning-related interaction with the other apparatus supported. Positioning-related interaction may comprise a message transmitted from the apparatus to the other apparatus requesting a certain configuration for the positioning-related information, or the manner in which positioning-related information is transmitted, and in turn, receiving a response to the configuration request message from the other apparatus. If a determination is made in step 1206 that no configuration-related interaction is supported (e.g., positioning-related information is transmitted in a fixed configuration), then the process made proceed to step 1208 wherein messages comprising configuration-related information may be received in the apparatus. In step 1210 apparatus position may then be determined including, for example, determining a direction to/from the apparatus relative from/to the other apparatus based on AoA or AoD estimation. The process may then be complete in step 1204 and may return to step 1200 in preparation for additional advertising messages to be received.

If in step 1206 a determination is made that positioning-related interaction is supported, then in step 1212 the apparatus may transmit a message comprising configuration information to the other apparatus. The message comprising configuration information may request a certain configuration for the content of the positioning-related information (e.g., type, length, etc.) and/or may request a certain configuration for transmission of the positioning-related information (e.g., a number or duration of transmissions, a transmission power level, a transmission interval, a channel-hopping map, etc.) In step 1214, the apparatus may receive a message responding to the configuration request, the response message confirming the configuration of the messages comprising positioning-related information that will be transmitted. The process may then return to step 1208 wherein messages comprising positioning-related information (e.g., configured in accordance with steps 1212 and 1214) are received in the apparatus. The apparatus may again determine apparatus position in step 1210, as set forth above, followed by the process terminating in step 1204 and reinitiating in step 1200.

Figure 13:
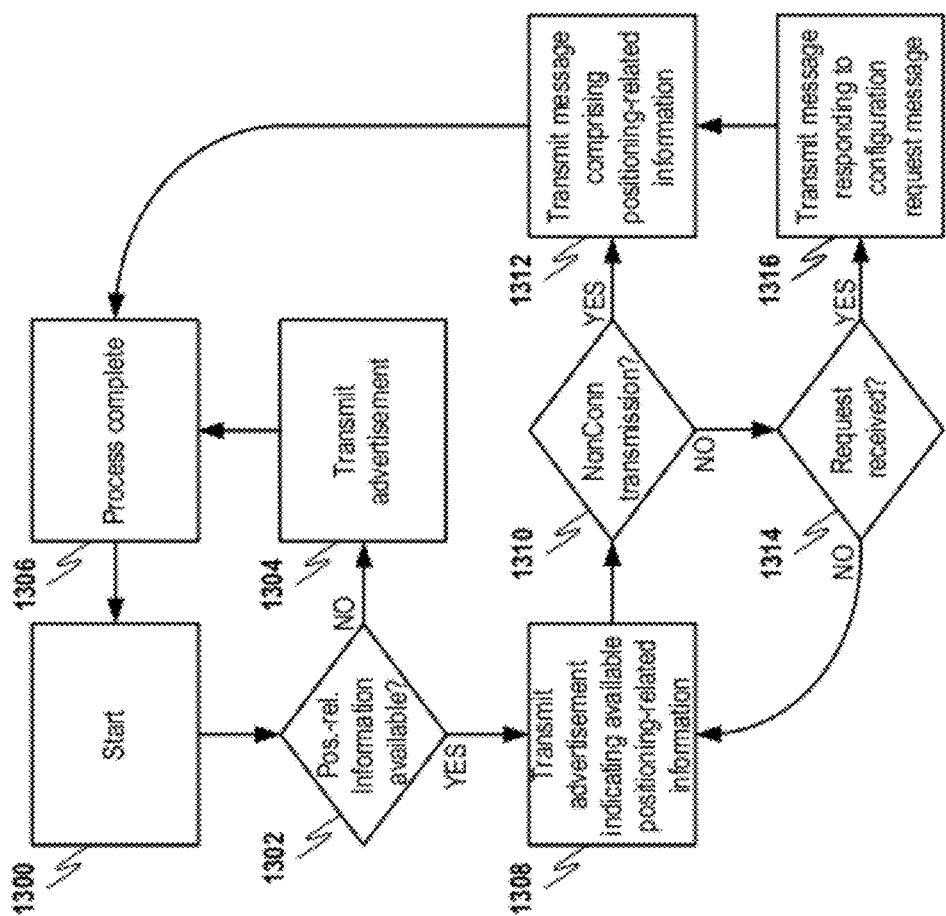
FIG. 13 discloses a flowchart of an example communication process from the perspective of an apparatus acting in a target role in accordance with at least one embodiment of the present invention.

A flowchart of an example communication process from the perspective of an example apparatus acting in the role of target, in accordance with at least one embodiment of the present invention, is now disclosed with respect to FIG. 13. The process may start in step 1300 and in step 1302 a determination may be made as to whether positioning-related information is available from an apparatus. For example, the apparatus may be enabled to provide positioning-related information that is currently not available due to conditions such as low power in the apparatus, security issues, etc. If in step 1302 a determination is made that positioning-related information is currently unavailable, then in step 1304 the apparatus may transmit at least one advertising message comprising no positioning-related indication, or alternatively, at least one advertising message indicating that positioning-related information is currently unavailable. The process may then be complete in step 1306 and may then reinitiate at step 1300. If in step 1302 a determination is made that positioning-related information is available, then in step 1308 at least one advertising message indicating the availability of positioning-related information from the apparatus may be transmitted. The at least one advertising message may, for example, advertise the presence of an apparatus and may further comprise information about positioning-related information that is available from the apparatus. The indication of positioning-related information being available from the apparatus may further indicate to another apparatus that the positioning-related information is configurable, which may perpetuate other apparatuses to send messages requesting configuration of the positioning-related information. A determination may be made in step 1310 as to whether the apparatus is configured to transmit messages comprising positioning-related information without any configuration interactions between the transmitting and receiving apparatuses (e.g., NonConn messages).

If the messages comprising positioning-related information are deemed NonConn messages, the process may proceed to step 1312, wherein at least one message comprising positioning-related information may be transmitted from the apparatus. In this instance the content, number, interval, power, etc. of messages comprising positioning-related information sent from the apparatus may be based on a predetermined configuration. The process may then be complete in step 1306 and may reinitiate at step 1300. Alternatively, if in step 1310 a determination is made that configuration request messages are permitted, then in step 1314 further determination may be made as to whether a message requesting configuration of the positioning-related information has been received. If in step 1314 it is determined that no response has been received, then the process may return to step 1308 for continued advertisement message transmission (e.g., until a timeout or transmission limit is reached, until the status of the apparatus changes, etc.) Otherwise, a response may be transmitted to the received configuration message in step 1316. The response message may comprise, for example, the configuration that will actually be used for transmitting the messages comprising positioning-related information. The process may then return to step 1312 to transmit at least one message comprising configuration-related information from the apparatus. However, in this instance the content, number, interval, power level, etc. of messages comprising positioning-related information sent from the apparatus may be based on the configuration established in step 1314. The process may then be complete in step 1306 and may reinitiate at step 1300.

The various embodiments of the present invention are not limited only to the examples disclosed above, and may encompass other configurations or implementations.

At least one example embodiment of the present invention may also include an apparatus comprising means for receiving one or more messages advertising the presence of another apparatus and including at least information indicating the availability of positioning-related information from the other apparatus, means for determining that positioning-related interaction with the other apparatus is available based on the received information, means for interacting with the other apparatus to initiate positioning-related information transmission, means for receiving at least one message from the other apparatus comprising the positioning-related information, and means for determining at least one of a relative direction towards or from the other apparatus based on the received positioning-related information.

At least one example embodiment of the present invention may also include an apparatus comprising means for transmitting at least one message via wireless communication, the at least one message advertising presence of the apparatus and information indicating the availability of positioning-related information from the apparatus, and means for transmitting at least one message comprising the positioning-related information.

At least one example embodiment of the present invention may also include electronic signals that cause an apparatus to receive one or more messages advertising the presence of another apparatus and including at least information indicating the availability of positioning-related information from the other apparatus, determine that positioning-related interaction with the other apparatus is available based on the received information, interact with the other apparatus to initiate positioning-related information transmission, receive at least one message from the other apparatus comprising the positioning-related information, and determine at least one of a relative direction towards or from the other apparatus based on the received positioning-related information.

At least one example embodiment of the present invention may also include electronic signals that cause an apparatus to transmit at least one message via wireless communication, the at least one message advertising presence of the apparatus and information indicating the availability of positioning-related information from the apparatus, and transmit at least one message comprising the positioning-related information.

Accordingly, it will be apparent to persons skilled in the relevant art that various changes in form a and detail can be made therein without departing from the spirit and scope of the invention. The breadth and scope of the present invention should not be limited by any of the above-described example embodiments, but should be defined only in accordance with the following claims and their equivalents.

What is claimed:
1. A method, comprising:
 receiving, at an apparatus, one or more messages advertising the presence of another apparatus and including at least information indicating the availability of positioning-related information from the other apparatus;
 obtaining, by the apparatus, information relating to a physical configuration of an antenna array in the other apparatus;
 interacting with the other apparatus to initiate positioning-related information transmission, by transmitting a request to the other apparatus for the positioning-related information to be sent having a requested configuration;
 receiving at least one message from the other apparatus comprising the positioning-related information having the requested configuration; and
 determining, at the apparatus, at least one of a relative direction towards or from the other apparatus based on the received positioning-related information and the obtained information relating to a physical configuration of the antenna array in the other apparatus.

2. The method of claim 1, wherein the information indicating the availability of positioning-related information further comprises at least one of whether the positioning-related information is configurable, transmission power settings for messages comprising positioning-related information, location coordinates for the other apparatus and antenna array-related information for the other apparatus.

3. The method of claim 1, wherein interacting with the other apparatus comprises transmitting a message comprising configuration information to the other apparatus and receiving a message comprising response information from the other apparatus.

4. The method of claim 1, wherein the positioning-related information comprises information usable for determining the relative direction towards or from the other apparatus with respect to the apparatus including at least one of a counter, a transmission power, an advertising channel activity indicator, an next channel indicator, a bit sequence and property information corresponding to the bit sequence.

5. A method, comprising:
    transmitting, by an apparatus, at least one message via wireless communication, the at least one message advertising presence of the apparatus and information indicating the availability of positioning-related information from the apparatus;
    receiving, at the apparatus, a request from another apparatus, for the positioning-related information to be sent having a requested configuration; and
    transmitting, by the apparatus, at least one message comprising the positioning-related information having the requested configuration and information relating to a physical configuration of an antenna array in the apparatus.

6. The method of claim 5, wherein the information indicating the availability of positioning-related information comprises at least a channel map indicating channels to be used when transmitting the at least one message comprising positioning information.

7. The method of claim 5, wherein the at least one message comprising positioning-related information is transmitted on a Bluetooth Low Energy data channel.

8. A computer program product, comprising computer executable program code recorded on a non-transitory computer readable storage medium, the computer executable program code comprising:
    code configured to cause an apparatus to receive one or more messages advertising the presence of another apparatus and including at least information indicating the availability of positioning-related information from the other apparatus;
    code configured to cause the apparatus to obtain information relating to a physical configuration of an antenna array in the other apparatus;
    code configured to cause the apparatus to interact with the other apparatus to initiate positioning-related information transmission, by transmitting a request to the other apparatus for the positioning-related information to be sent having a requested configuration;
    code configured to cause the apparatus to receive at least one message from the other apparatus comprising the positioning-related information having the requested configuration; and
    code configured to cause the apparatus to determine at least one of a relative direction towards or from the other apparatus based on the received positioning-related information and the obtained information relating to a physical configuration of the antenna array in the other apparatus.

9. The computer program product of claim 8, wherein the information indicating the availability of positioning-related information further comprises at least one of whether the positioning-related information is configurable, transmission power settings for messages comprising positioning-related information, location coordinates for the other apparatus and antenna array-related information for the other apparatus.

10. The computer program product of claim 8, wherein the code configured to cause the apparatus to interact with the other apparatus comprises code configured to cause the apparatus to transmit a message comprising configuration information to the other apparatus and receive a message comprising response information from the other apparatus.

11. The computer program product of claim 8, wherein the positioning-related information comprises information usable for determining the relative direction towards or from the other apparatus with respect to the apparatus including at least one of a counter, a transmission power, an advertising channel activity indicator, an next channel indicator, a bit sequence and property information corresponding to the bit sequence.

12. A computer program product, comprising computer executable program code recorded on a non-transitory computer readable storage medium, the computer executable program code comprising:
    code configured to cause an apparatus to transmit at least one message via wireless communication, the at least one message advertising presence of the apparatus and information indicating the availability of positioning-related information from the apparatus;
    code configured to cause an apparatus to receive a request from another apparatus, for the positioning-related information to be sent having a requested configuration; and
    code configured to cause an apparatus to transmit at least one message comprising the positioning-related information having the requested configuration and information relating to a physical configuration of an antenna array in the apparatus.

13. The computer program product of claim 12, wherein the information indicating the availability of positioning-related information comprises at least a channel map indicating channels to be used when transmitting the at least one message comprising positioning information.

14. The computer program product of claim 12, wherein the at least one message comprising positioning-related information is transmitted on a Bluetooth Low Energy data channel.

15. An apparatus, comprising:
    at least one processor; and
    at least one memory including executable instructions, the at least one memory and the executable instructions being configured to, in cooperation with the at least one processor, cause the apparatus to perform at least the following:
    receive one or more messages advertising the presence of another apparatus and including at least information indicating the availability of positioning-related information from the other apparatus;
    obtaining, by the apparatus, information relating to a physical configuration of an antenna array in the other apparatus;
    interact with the other apparatus to initiate positioning-related information transmission, by transmitting a request to the other apparatus for the positioning-related information to be sent having a requested configuration;

receive at least one message from the other apparatus comprising the positioning-related information having the requested configuration; and determine at least one of a relative direction towards or from the other apparatus based on the received positioning-related information and the obtained information relating to a physical configuration of the antenna array in the other apparatus.

16. The apparatus of claim 15, wherein the information indicating the availability of positioning-related information further comprises at least one of whether the positioning-related information is configurable, transmission power settings for messages comprising positioning-related information, location coordinates for the other apparatus and antenna array-related information for the other apparatus.

17. The apparatus of claim 15, wherein the at least one memory and the executable instructions being configured to, in cooperation with the at least one processor, cause the apparatus to interact with the other apparatus comprises the at least one memory and the executable instructions being configured to, in cooperation with the at least one processor, cause the apparatus to transmit a message comprising configuration information to the other apparatus and receive a message comprising response information from the other apparatus.

18. The apparatus of claim 17, wherein the configuration information comprises a request for at least one of an amount of messages comprising positioning-related information to be transmitted, a time period during which messages comprising positioning-related information are transmitted, a type of positioning-related information, a transmission power for messages comprising positioning-related information, a transmission interval for messages comprising positioning-related information, and a channel map.

19. The apparatus of claim 17, wherein the response information comprises at least one of an amount of messages comprising positioning-related information to be transmitted, a time period during which messages comprising positioning-related information are transmitted, a type of positioning-related information, a transmission power for messages comprising positioning-related information, a transmission interval for messages comprising positioning-related information, and a channel map.

20. The apparatus of claim 15, wherein the positioning-related information comprises information usable for determining the relative direction towards or from the other apparatus with respect to the apparatus including at least one of a counter, a transmission power, an advertising channel activity indicator, an next channel indicator, a bit sequence and property information corresponding to the bit sequence.

21. An apparatus, comprising:
at least one processor; and
at least one memory including executable instructions, the at least one memory and the executable instructions being configured to, in cooperation with the at least one processor, cause the apparatus to perform at least the following:

transmit at least one message via wireless communication, the at least one message advertising presence of the apparatus and information indicating the availability of positioning-related information from the apparatus;

receive a request from another apparatus, for the positioning-related information to be sent having a requested configuration; and transmit at least one message comprising the positioning-related information having the requested configuration and information relating to a physical configuration of an antenna array in the apparatus.

22. The apparatus of claim 21, wherein the information indicating the availability of positioning-related information comprises at least a channel map indicating channels to be used when transmitting the at least one message comprising positioning information.

23. The apparatus of claim 21, wherein the at least one message comprising positioning-related information is transmitted on a Bluetooth Low Energy data channel.

* * * * *